US009253428B2

(12) United States Patent
Allison, III et al.

(10) Patent No.: US 9,253,428 B2
(45) Date of Patent: Feb. 2, 2016

(54) BROADCASTING SYSTEM WITH DIGITAL TELEVISION SIGNALS AND METADATA THAT MODULATE RESPECTIVE SETS OF OFDM CARRIERS

(71) Applicants: Arthur Webb Allison, III, Silver Spring, MD (US); Allen LeRoy Limberg, Port Charlotte, FL (US)

(72) Inventors: Arthur Webb Allison, III, Silver Spring, MD (US); Allen LeRoy Limberg, Port Charlotte, FL (US)

( * ) Notice: Subject to any disclaimer, the term of this patent is extended or adjusted under 35 U.S.C. 154(b) by 0 days.

(21) Appl. No.: 14/717,220

(22) Filed: May 20, 2015

(65) Prior Publication Data

US 2015/0341586 A1 Nov. 26, 2015

Related U.S. Application Data

(60) Provisional application No. 62/001,123, filed on May 21, 2014, provisional application No. 62/009,457, filed on Jun. 9, 2014.

(51) Int. Cl.
*H04N 5/40* (2006.01)
*H04N 21/2383* (2011.01)
*H04L 27/26* (2006.01)

(52) U.S. Cl.
CPC .............. *H04N 5/40* (2013.01); *H04L 27/2605* (2013.01); *H04L 27/2649* (2013.01); *H04N 21/2383* (2013.01)

(58) Field of Classification Search
USPC .................................................. 375/260, 286
See application file for complete search history.

(56) References Cited

U.S. PATENT DOCUMENTS

| | | | | |
|---|---|---|---|---|
| 7,471,733 B1* | 12/2008 | Payne, III | ............. | H04L 1/0041 375/286 |
| 2002/0147978 A1* | 10/2002 | Dolgonos | ........... | H04L 12/1836 725/62 |
| 2013/0239149 A1* | 9/2013 | Kim | .................... | H04N 21/2362 725/59 |
| 2015/0138972 A1* | 5/2015 | Peeters | ............... | H04M 11/062 370/235 |
| 2015/0215789 A1* | 7/2015 | Shin | ...................... | H04W 16/14 455/454 |

* cited by examiner

*Primary Examiner* — Eva Puente

(57) ABSTRACT

Digital television (DTV) broadcasting using COFDM modulation is designed to modulate orthogonal frequency-division-multiplexed (OFDM) mid-band carriers with metadata including synchronization signals and transmission-mode signals. DTV signals modulate OFDM carriers occupying portions of the frequency spectrum of the transmission channel that extend in frequency both below and above these mid-band carriers. The OFDM midband carriers are capable of signaling when a new broadcast service is used that differs from the one disclosed. The signaling is provided by modulating the midband carriers with respective elements of signature sequences, each of which signature sequences is composed of Zadoff-Chu sequences and repetitive pseudo-random sequences scrambled by a Zadoff-Chu sequence.

30 Claims, 14 Drawing Sheets

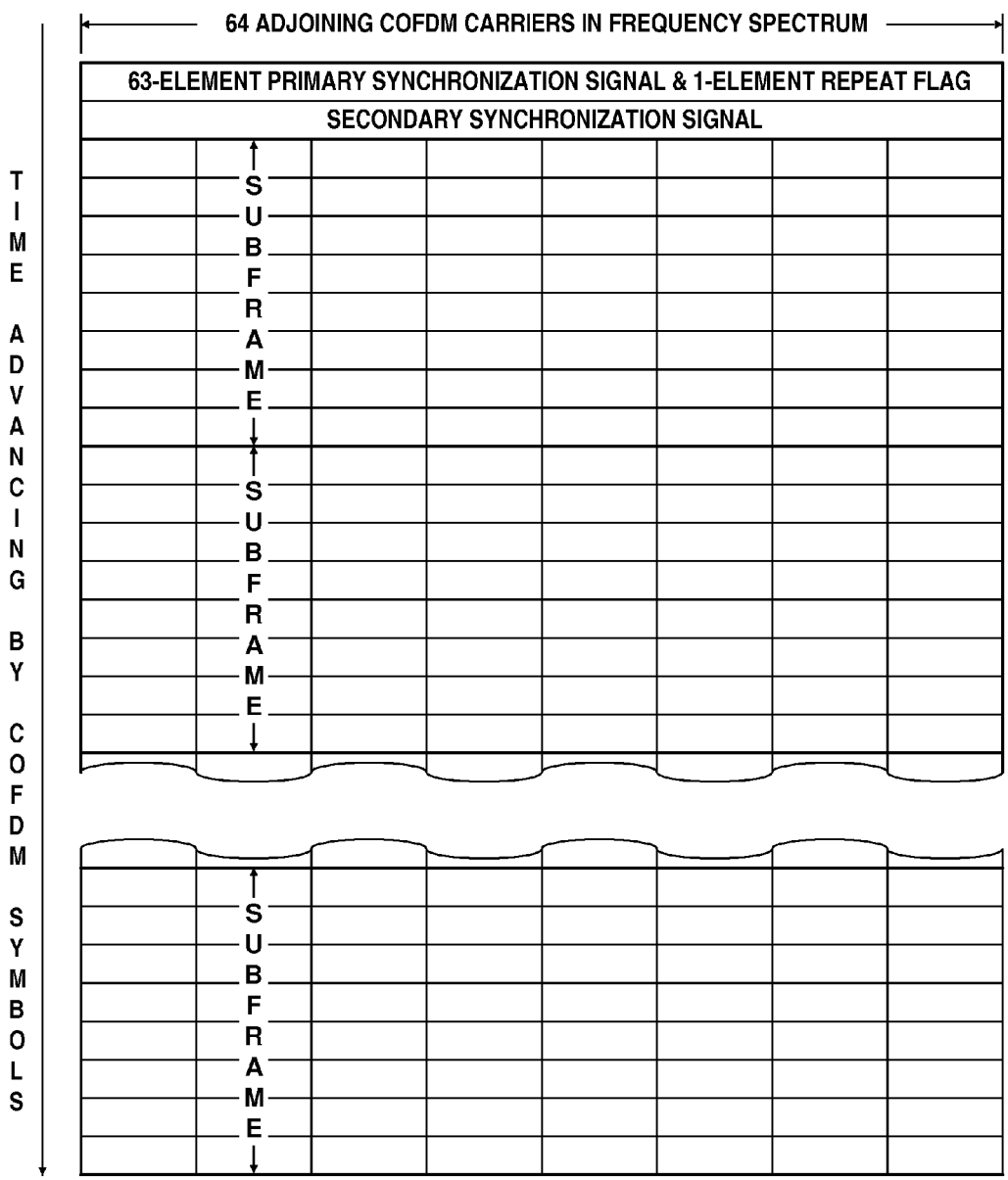
Fig. 5 Format of "Half" Metadata Frame $$ZC_{N,M}[k] = \begin{cases} e \exp[-j\, M\pi\, k(k+1)/N] & \text{for integer } N < 32 \\ e \exp[-j\, M\pi\, k(k+1)(k+2)/N] & \text{for integer } N > 32 \end{cases}$$

For $k = 0, 1, 2 \ldots \ldots (N-1)$ and root index $M$ relative prime to $N$. (No common divider, i.e. $M$ = square root of $(N-1)$. $M$ denotes the sequence family.

$M$ = 25, 29 or 34 for Primary Synchronization Signal (PSS) of length $N$ = 63 in the first COFDM symbol interval in the preamble of a metadata frame.

Fig. 6 Zadoff-Chu Sequence (ZC)

The sequence $d(0),\ldots d(61)$ used as secondary sychronization signal (SSS) in the first half of a metadata frame is an interleaved concatenation of two PN31 sequences, following, as scrambled by ZC.

$$d(2n) = s_0^{(m_0)}(n) c_0(n)$$

$$d(2n+1) = s_1^{(m_1)}(n) c_1(n) z_1^{(m_0)}(n)$$

The sequence $d(0),\ldots d(61)$ used as secondary sychronization signal (SSS) in the second half of a metadata frame is an interleaved concatenation of two PN31 sequences, following, as scrambled by ZC.

$$d(2n) = s_1^{(m_1)}(n) c_0(n)$$

$$d(2n+1) = s_0^{(m_0)}(n) c_1(n) z_1^{(m_1)}(n)$$

Fig. 7 Interleaved PN31 Sequences

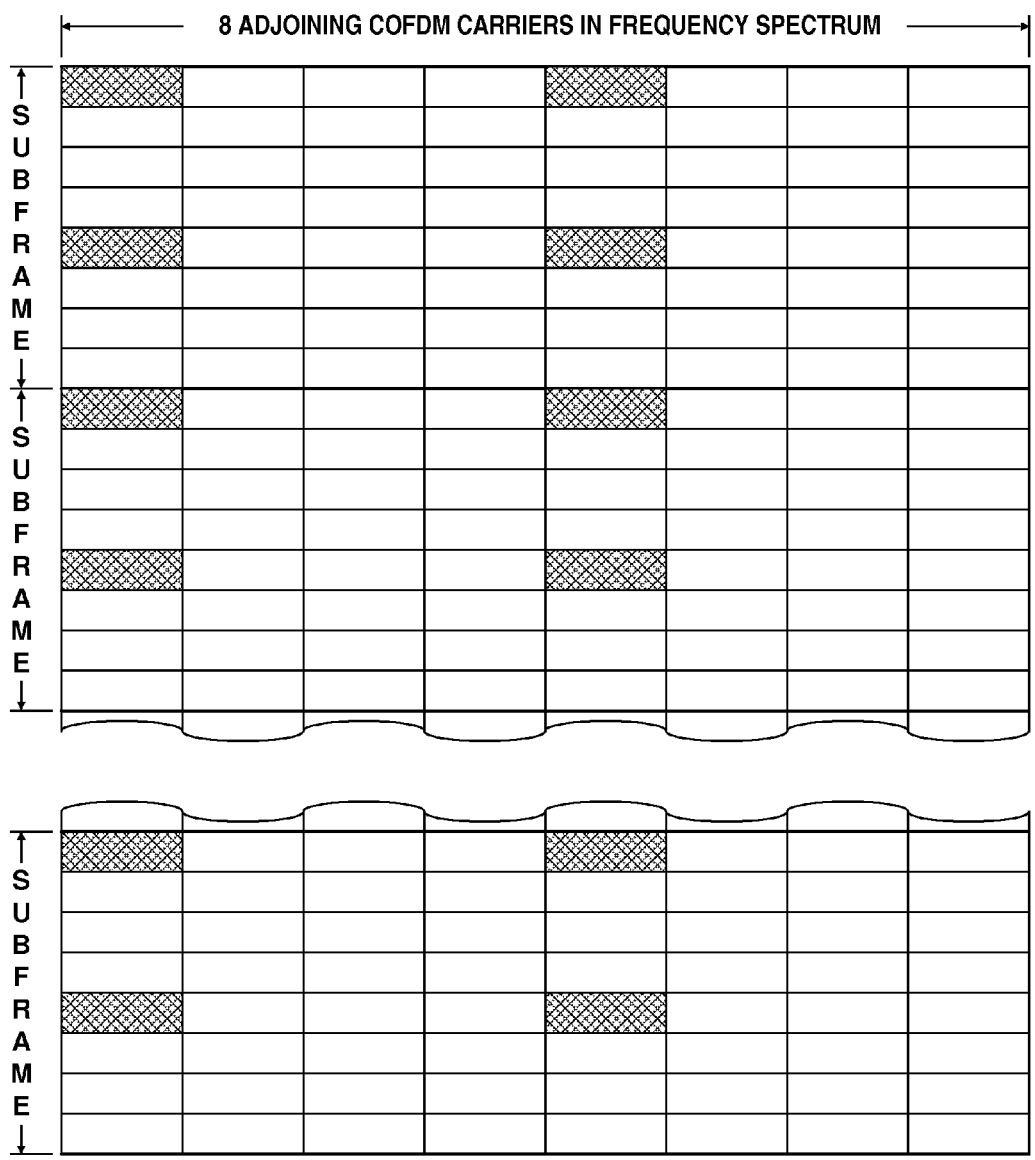
Fig. 8   Format of Resource Blocks

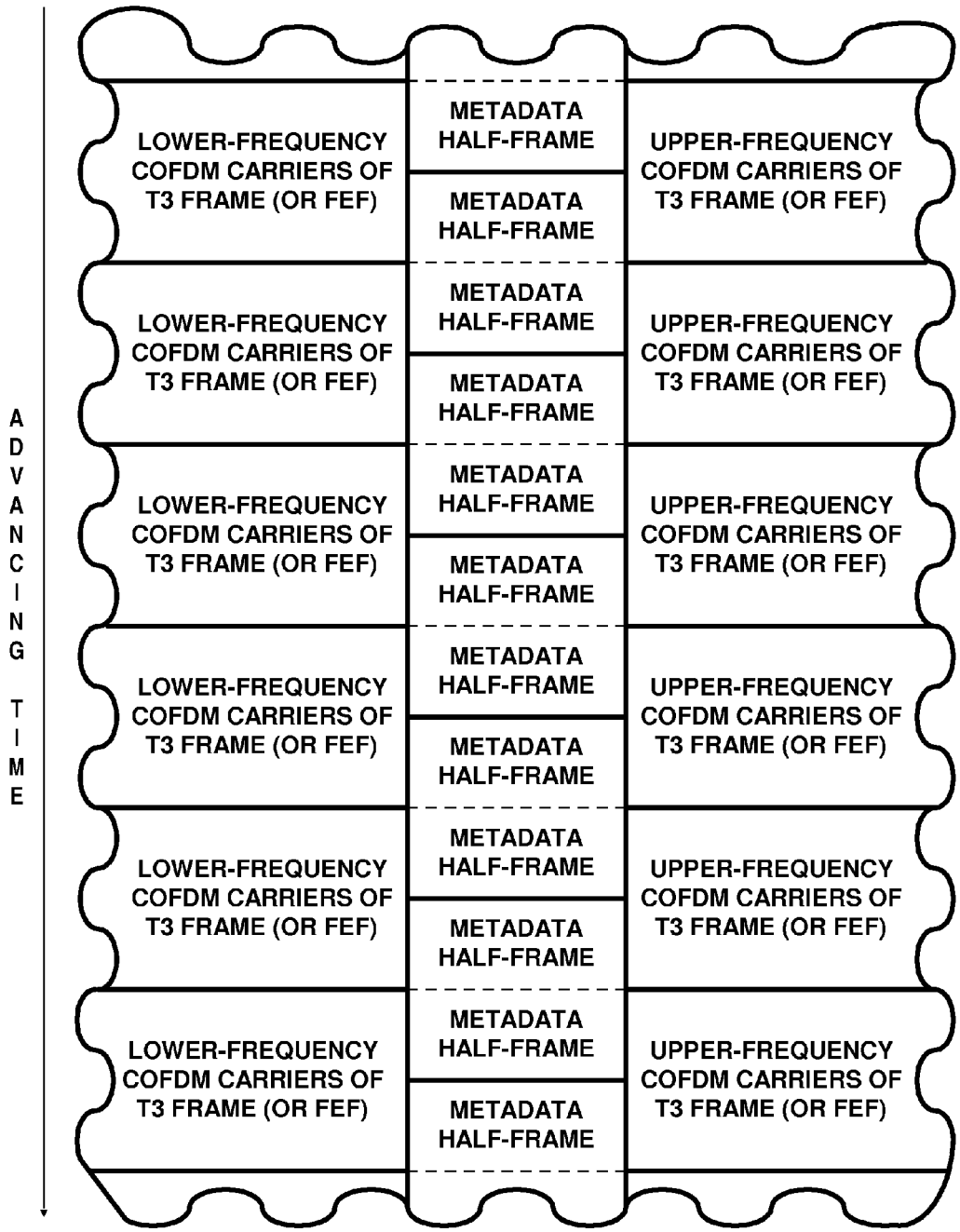
Fig. 9 Disposition of Metadata Frames

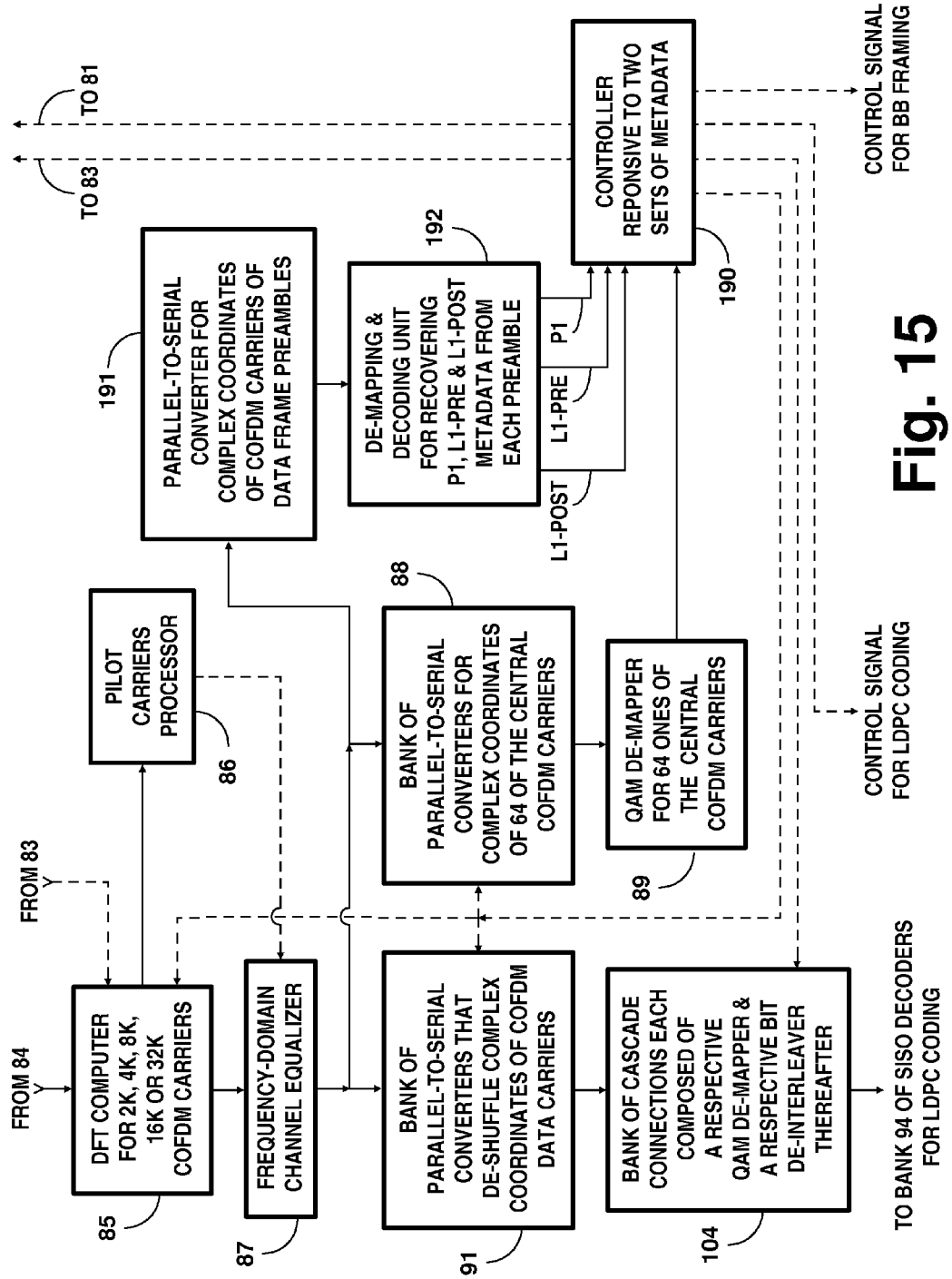

BROADCASTING SYSTEM WITH DIGITAL TELEVISION SIGNALS AND METADATA THAT MODULATE RESPECTIVE SETS OF OFDM CARRIERS

This application claims the benefit of the filing date of provisional U.S. Pat. App. Ser. No. 62/001,123 filed 21 May 2014. This application also claims the benefit of the filing date of provisional U.S. Pat. App. Ser. No. 62/009,457 filed 9 Jun. 2014.

The invention is directed to aspects of a system for broadcasting digital television (DTV) signals using coded orthogonal frequency multiplexed (COFDM) carrier waves.

BACKGROUND OF THE INVENTION

Techniques for COFDM DTV broadcasting are prescribed in the ETSI TS 302 755 V1.3.2 Technical Specification titled "Digital Video Broadcasting (DVB); Frame structure channel coding and modulation for a second generation digital terrestrial television broadcasting system (DVB-T2)" published in April 2012 by the European Telecommunications Standards Institute. This DVB-T2 standard is based on time-division multiplex of T2 frames of COFDM symbols possibly having future-extension frames (FEFs) interleaved therewith, every six consecutive ones of which frames is considered to constitute a "super frame". The duration of a T2 frame can be of as long a length as 250 ms (milliseconds) and begins with a P1 portion of a preamble, which P1 portion signals which of various ways for transmitting COFDM DTV signals is currently in use. The number of ways for transmitting COFDM DTV signals that can be signaled in each P1 preamble is 24, 8 in an S1 period and 16 in an ensuing S2 period. The three-bit S1 field indicates whether the currently incoming transmissions are T2 frames using 64,800-bit LDPC codeblocks, T2-lite frames using 16,200-bit FEC codeblocks, or FEFs using some still-to-be-decided form of FEC coding. The three-bit S1 field further indicates whether the P2 portion of the preamble following the P1 portion is to be interpreted presuming single-input/single-output (SISO) reception or multiple-input/single-output (MISO) reception. The first 3 bits of the 4-bit S2 field are referred to as S2 field 1. When the preamble format is of the typeT2_SISO, T2_MISO, T2-LITE_SISO or T2-LITE_MISO, S2 field 1 indicates the FFT size and gives partial information about the guard interval for the remaining symbols in the T2-frame. The ensuing single-bit S2 field 2 that concludes the S2 field indicates whether the preambles of all the T2 frames in a super frame are all of the same type or not.

DVB-T2 permits the time-division multiplexing of several physical layer pipes (PLPs), and information concerning the operating characteristics of those PLPs) is conveyed by first-layer (L1) signals that immediately follow the P2 portion of the preamble. Each L1 signal consists of an L1-pre signaling initial portion followed by an L1-post signaling portion. All L1 signaling data, except for the dynamic L1-post signaling, shall remain unchanged for the entire duration of one super-frame. Therefore, any changes implemented to the current configuration (i.e., the contents of the L1-pre signaling or the configurable part of the L1-post signaling) shall always occur at the transition from one super-frame to the consecutive next super-frame. The L1-pre signaling is 200 bits in size. It specifies whether the L1 signal is a repeat or not, the length of guard intervals, the type of peak-to-average-power ratio (PAPR) reduction employed, the natures of FEC coding and the modulation of OFDM carriers in the ensuing L1-post signaling, the size of the ensuing L1-post signaling, pilot carrier pattern, whether L1-post signaling is scrambled or not, and other items related to super-frame structure. The L1-pre signaling concludes with 32 parity bits of cyclic redundancy check (CRC) coding. The so-called "configurable" portion of L1-post signaling is 257 bits in size and comprises information relating to FEFs and to PLPs. The "configurable" field can be followed by "dynamic" and "extension" fields. The L1-post signal concludes with 32 parity bits of CRC coding followed by bits for padding the L1-post signal to prescribed size.

The complete L1 signal includes 457 bits for signaling. Nonetheless, additional signaling capability may be required, and per custom this has been afforded by so-called "in-band" signaling wherein control signals replace portions of the broadcast normally allocated to DTV signal. In-band signaling undesirably complicates time-division multiplexing of components of the baseband signal to be up-converted in frequency and then broadcast. More important, in-band signaling undesirably complicates de-multiplexing of components of the baseband signal in a COFDM DTV receiver. In-band signaling tends to reduce digital payload in the DTV broadcast system, but this undesirable effect can be mitigated by replacing the bits for padding the L1-post signal with at least part of the in-band signaling.

The Advanced Television Systems Committee (ATSC) is an international consortium of television broadcasters, manufacturers of equipment for transmitting DTV signals, and manufacturers of equipment for receiving DTV signals. ATSC seeks to develop a "universal" standard for terrestrial over-the-air COFDM DTV broadcasting in most countries in the world, which countries prescribe a variety of permissible radio-frequency channels for such broadcasting. These RF channels have different bandwidths in different countries, six megahertz (MHz) bandwidth being used in North American countries and 8 MHz bandwidth being used in European and Asian countries. Manufacturers of equipment for receiving DTV signals are apt eventually to desire development of a bandwidth-agnostic way to specify the nature of RF channels selected for reception. A bandwidth-agnostic way of specifying the nature of RF channels selected for reception would allow portable DTV receivers to continue to be able to receive DTV signals usefully when transported from a country in which 6 MHz RF bandwidths are used in over-the-air DTV broadcasting to a country in which 8 MHz RF bandwidths are used for over-the-air DTV broadcasting, or vice versa. A bandwidth-agnostic way of specifying the nature of RF channels selected for reception might also reduce the number of different electronics designs for DTV receivers that a DTV receiver manufacturer might have to produce to encompass a global market for them.

The Long Term Evolution (LTE) cell-telephone standard specifies coded orthogonal frequency multiplexed (COFDM) carriers being used to convey down-link telephonic signals and single-carrier frequency-division multiple-access (SC-FDMA) being used to convey up-link telephonic signals. SC-FDMA is favored over OFDM in the uplink communications where lower peak-to-average power ratio (PAPR) greatly benefits the mobile terminal in terms of transmit power efficiency and reduced cost of the power amplifier. The signaling as to which of various ways for transmitting COFDM down-link telephonic signals is currently being received by a cell telephone is specified by the modulations of 72 COFDM carriers located in the central portion of the radio-frequency (RF) channel, 12-carrier-wide groups of which 72 carriers each include receiver synchronization signaling and 84-bit Master Information Blocks (MIBs). The 72 COFDM carriers use Evolved Universal Terrestrial Radio Access (E-UTRA) modulation specified in the 3GPP TS 36.211 V9.1.0 standard published in March 2010 by the 3rd Generation Partnership Project (3GPP). Current practice is further described in the ETSI TS 125 213 V10.0.0 Technical Specification titled "Universal Mobile Telecommunications System (UMTS); Spreading and modulation (FDD)" published in May 2011 by the European Telecommunications Standards Institute and corresponding to the 3GPP TS 25.213 V 10.0.0 standard.

The location of E-UTRA modulation of 72 COFDM carriers in the middle of the RF channel is bandwidth-agnostic, the information as to RF channel bandwidth being conveyed within the MIB block. Also, the E-UTRA modulation conveys a considerable number of bits of information in patterns of pilot carriers therein. These observations inspired the inventors to consider to whether or not the E-UTRA modulation might be adapted to meeting goals they perceived to exist in prior-art COFDM DTV broadcasting systems.

In a first type of E-UTRA modulation used for down-link in cell telephony, the 72 COFDM carriers are considered to be grouped in six groups of 12 adjacent carriers within frames 10 milliseconds in duration. Each frame is apportioned into ten sub-frames of like duration, and each sub-frame consists of seven sample periods. Each sub-frame includes seventy-two subcarriers times seven sampling periods for a total capacity of 72×7=504 bits. Every 5 milliseconds 63 central ones of the 72 COFDM carriers in this E-UTRA modulation are briefly modulated for one sample period by respective elements of a Zadoff-Chu sequence, also known as a generalized "chirp" sequence. In the next sampling period 62 central ones of the 72 COFDM carriers are modulated by respective elements of two concatenated 31-bit pseudo-random noise (PN31) sequences as additively scrambled in accordance with the preceding Zadoff-Chu sequence. In the context of the first type of E-UTRA modulation, the Zadoff-Chu sequence is referred to as "primary synchronization signal", and the scrambled concatenated pair of PN31 sequences is referred to as "secondary synchronization signal". Pilot carriers at positions other than those in these synchronization signals are referred to as "reference symbols" and are used to specify sectors and cells in cell telephony.

COFDM DTV broadcasting systems use a large number of COFDM carriers. Typically, this number approaches 2 048, 4 096, 8 192, 16 384 or 32 768. In DVB-T2 these numbers are 1 705, 3 409, 6 817, 13 633 and 27 265 respectively. Generally, these numbers are loosely referred to as 2K, 4K, 8K, 16K and 32K, respectively. The inventors observed it to be desirable that as many as possible of the COFDM carriers be dedicated to conveying DTV signals, rather than metadata descriptive of the DTV signals. Accordingly, the inventors prefer modifying the first type of E-UTRA modulation used for down-link in cell telephony so as to include just 64 COFDM carriers when such modulation is instead used to transmit metadata concerning DTV signals in a DTV broadcasting system. Preferably such modification includes grouping the 64 COFDM carriers in eight groups of eight adjacent carriers and extending sub-frames of metadata to include eight sample periods. Then, each sub-frame of metadata includes sixty-four subcarriers times eight sampling periods for a total capacity of 64×8=512 bits.

Sampling periods are adjusted to be the same rate as those used in the DTV signal and are several times longer than for the E-UTRA modulation used for down-link in cell telephony. Frame size for the metadata is likely to vary depending upon FFT size and upon the durations of T2 frames and FEFs. A sophisticated practice is to time accurately the primary synchronization signals in the E-UTRA modulation used in conveying metadata about DTV respective to the occurrences of T2 frames and FEFs in the COFDM DTV signal.

In the continuing development of DTV broadcasting, new systems are apt to be developed that cannot be usefully received by DTV receivers already in the field. It would be useful if receivers could be signaled as to the general type of DTV broadcasting system or other broadcasting system currently occupied an RF channel. This would facilitate receivers determining whether a currently received RF broadcast signal was of a general type that the receiver was capable of usefully receiving. This feature is especially useful for receivers designed for receiving signals broadcast according to a variety of transmission standards used in different countries.

The "universal" standard to be developed for terrestrial over-the-air COFDM DTV broadcasting is expected to be used for many years and is referred to as ATSC 3.0. However, a concern of the broadcasting community as expressed in ATSC is that the development of future standards for terrestrial over-the-air COFDM DTV broadcasting be accommodated by transmitters specifically signaling receivers as to whether they transmit COFDM TV according to DVB-T2, ATSC 3.0, some later version of ATSC 3.0 or some future broadcasting standard. Increasing the number of bits in the "configurable" portion of L1-post signaling to accommodate additional parameters descriptive of some later version of ATSC 3.0 or some future broadcast standard undesirably increases signaling overhead.

An alternative approach is to encode a digital signature sequence that is the key for specific interpretation of further bits of signaling in an L1 signal of a data frame similar to a DVB-T2 data frame. This facilitates one of a plurality of different broadcast standards using some or all of the further bits in an L1 signal differently from another or others of that plurality of different broadcast standards. It is desirable that a number of digital signature sequences can each be readily distinguished from each and all of the others, but this tends to require digital signature sequences quite a few bits long, which also tends to increase signaling overhead, although perhaps to lesser degree than extending the L1 signal or augmenting the L1 signal with in-band signaling that replaces data.

SUMMARY OF THE INVENTION

An aspect of the invention is a method for signaling which of various ways for transmitting COFDM DTV signals is currently in use. Metadata concerning FFT size, the type of COFDM carrier modulation and the type of FEC coding is transmitted in a Master Information Block (MIB) conveyed by scattered modulation of carrier waves in the central portion of the radio-frequency (RF) RF channel. A further aspect of the invention is transmitter apparatus employing such method for signaling which of various ways a system for broadcasting COFDM DTV signals permits is currently in use. A still further aspect of the invention is transmitter apparatus for signaling which of various general types of broadcasting systems is currently in use.

An aspect of the invention is embodied in apparatus that is capable of receiving COFDM DTV signals wherein metadata concerning FFT size, the type of COFDM carrier modulation and the type of FEC coding is transmitted in a Master Information Block (MIB) conveyed in scattered modulation of carrier waves in the central portion of the RF channel. Such apparatus is particularly useful in DTV receivers capable of receiving COFDM DTV signals broadcast in various countries, not all of which countries use the same bandwidth radio-frequency channels or the same reception standard.

BRIEF DESCRIPTION OF THE DRAWINGS

FIG. 5 is an illustration of the format of "half" metadata frames in a type of E-ULTRA signal designed for use in DTV broadcasting.

FIG. 6 is an illustration concerning the Zadoff-Chu sequence used as a primary synchronization signal (PSS) in "half" metadata frames as illustrated in FIG. 5.

FIG. 7 is an illustration concerning the interleaved 31-element pseudo-random noise sequences used in formulating a secondary synchronization signal (SSS) in "half" metadata frames as illustrated in FIG. 5.

FIG. 8 is an illustration detailing the format of resource blocks within metadata frames per FIG. 5.

FIG. 9 is an illustration depicting a preferred way of frequency-interleaving the COFDM carriers of "half" metadata frames per FIG. 5 with the COFDM carriers of T2 frames and future-extension frames in a super-frame used in DTV broadcasting.

FIGS. 12 and 11 together form a schematic diagram of alternative COFDM receiver apparatus that embodies aspects of the invention.

FIG. 15 is a schematic diagram of a modification made to the FIG. 12 COFDM receiver apparatus, which modification facilitates the reception of transmissions in which metadata is conveyed in preambles of data frames in addition to metadata being conveyed in metadata frames.

DETAILED DESCRIPTION

Figure 1:
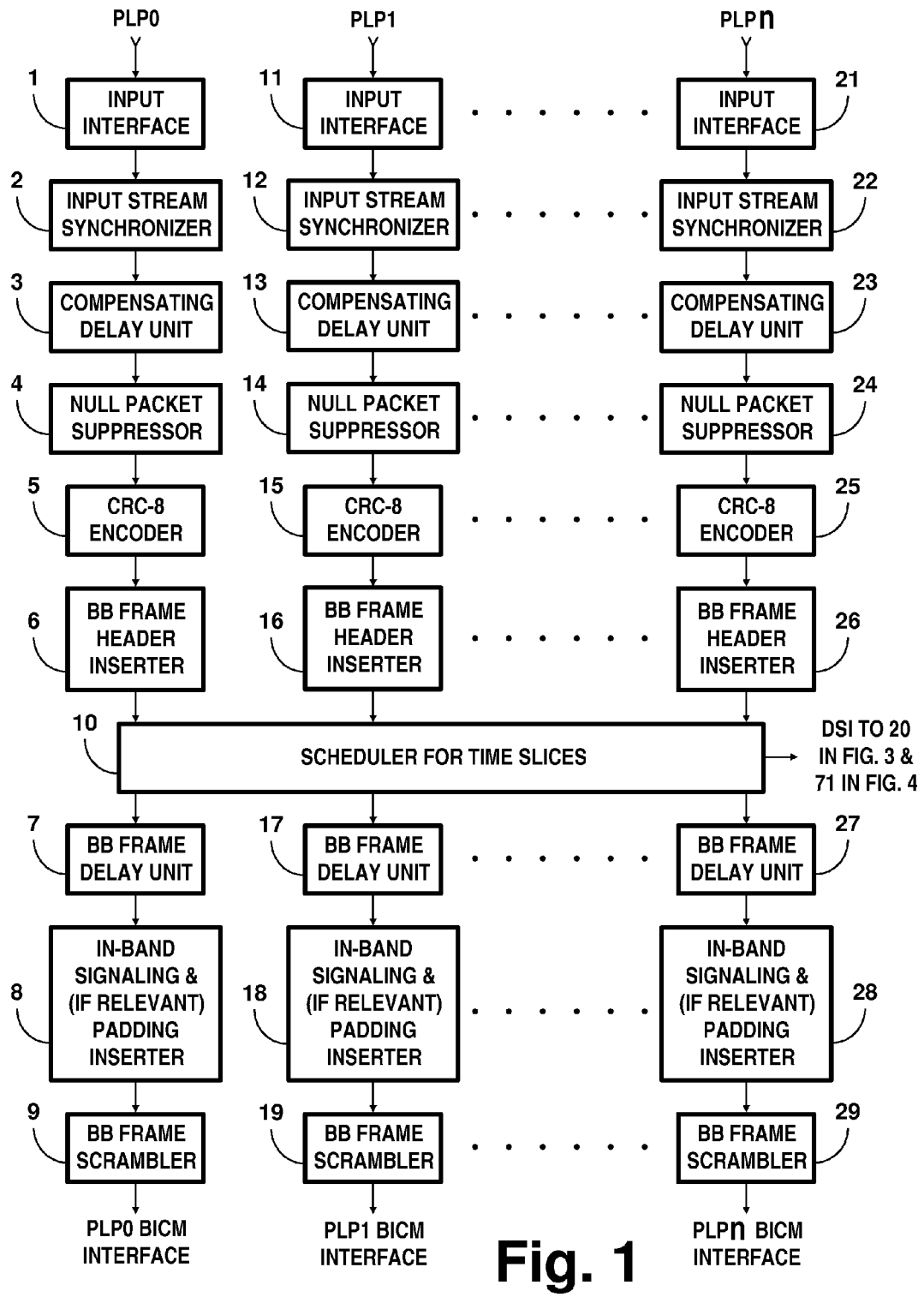
FIGS. 1, 2, 3 and 4 together form a schematic diagram of COFDM transmitter apparatus embodying aspects of the invention, which transmitter apparatus includes apparatus for generating COFDM metadata descriptive of the DTV signal.
Figure 2:
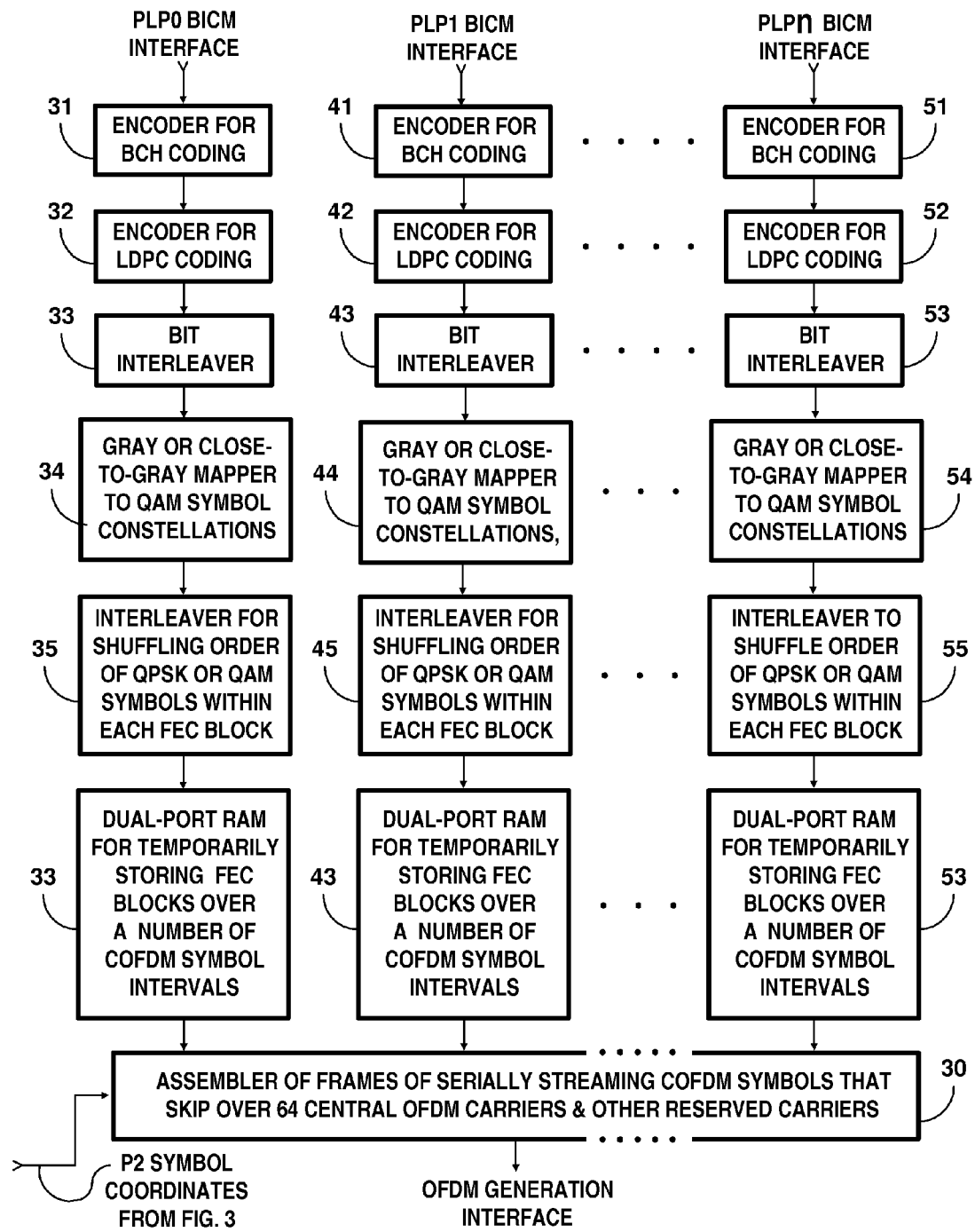
Figure 3:
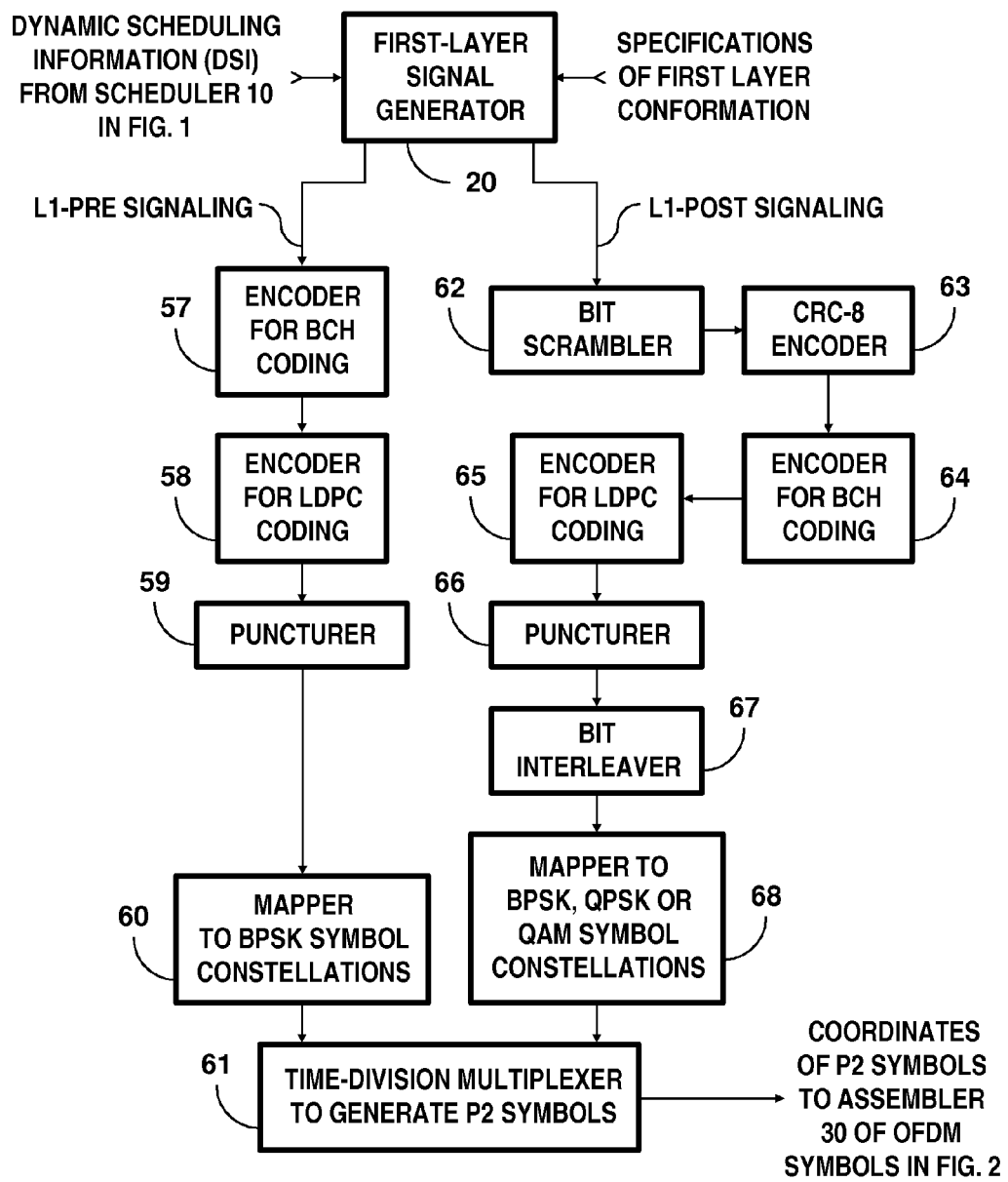
Figure 4:
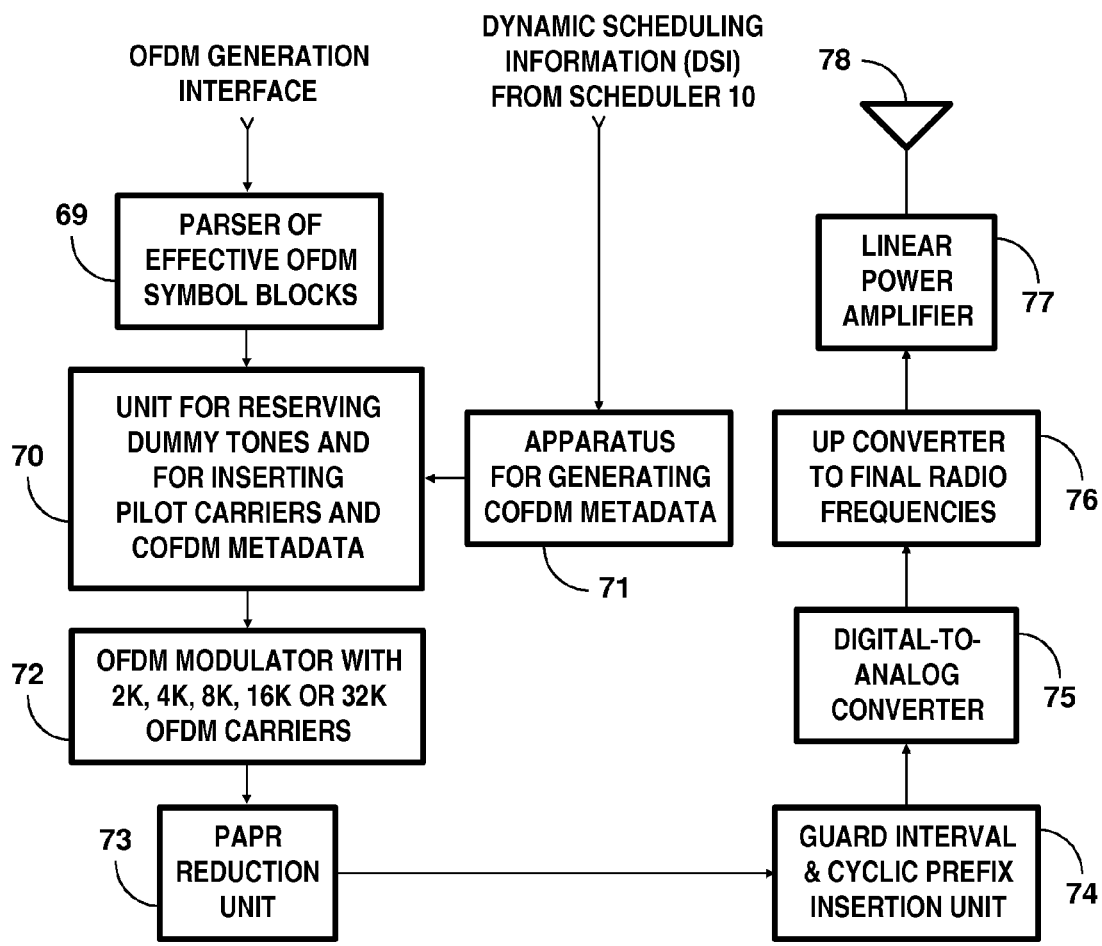

FIGS. 1, 2, 3 and 4 depict a DTV transmitter apparatus generating COFDM signals designed for reception by DTV receivers. FIG. 1 depicts apparatus for generating baseband frames (BBFRAMES) at a Bit-Interleaved Coding and Modulation (BICM) interface. FIG. 2 depicts apparatus for generating forward-error-correction (FEC) coding and subsequent frames of COFDM symbol blocks responsive to the BBFRAMEs supplied at the BICM interface. FIG. 3 depicts apparatus for generating bit-wise forward-error-correction (FEC) coding and subsequent COFDM symbol blocks responsive to first layer (L1) conformation specifications and to dynamic scheduling information (DSI). FIG. 4 depicts apparatus for generating and transmitting radio-frequency COFDM signals. FIG. 4 further depicts apparatus for inserting baseband metadata including Master Information Blocks (MIBs) into frames of COFDM symbol blocks before subsequently generating and transmitting radio-frequency COFDM signals. Except for the insertion of baseband metadata signals into COFDM symbols to augment or to replace the preambles of T2 frames, the DTV transmitter apparatus depicted in FIGS. 1, 2, 3 and 4 is essentially the same as specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference. For convenience, this specification uses the term "T3 frames" when referring to T2 frames modified to skip over baseband metadata portions of COFDM symbols as well as portions of COFDM symbols reserved for scattered pilot carriers and dummy tones.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. As depicted in FIG. 2 the scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each T3 frame following the P1 and P2 symbols, if such be maintained rather than omitted, but before the data PLP or PLPs. A data PLP may be of a first type transmitted as a single slice per T3 frame, or a data PLP may be of a second type transmitted as a plurality of sub-slices disposed in non-contiguous portions of each T3 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 bit-interleaved coding and modulation (BICM) interface. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is not sufficient to completely fill a BBFRAME, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 BICM interface. In practice the delay unit 7, the inserter 8 and the BBFRAME scrambler 9 are realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 bit-interleaved coding and modulation (BICM) interface. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data randomizes bits of the BBFRAME supplied from the output port of the BBFRAME scrambler 19 as the PLP1 BICM interface. In practice the delay unit 17, the inserter 18 and the BBFRAME scrambler 19 are realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn bit-interleaved coding and modulation (BICM) interface. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn BICM interface. In practice the delay unit 27, the inserter 28 and the BBFRAME scrambler 29 are realized by suitable operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate variable bit-rate services in a constant bit-rate TS. In such a case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions they originally were in, thus guaranteeing constant bit-rate and avoiding the need for updating the Programme Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 depicts the (n+1)th physical layer pipe PLP0 further comprising elements 31-36 in cascade connection after the PLP0 BICM interface, but before a respective input port of an assembler 30 for assembling a serial stream of OFDM symbols. More specifically, FIG. 2 depicts an encoder 31 for Bose-Chaudhuri-Hocquenghem (BCH) coding with its input port connected to receive the PLP0 BICM interface signal from the output port of the BBFRAME scrambler 9 and with its output port connected to the input port of an encoder 32 for LDPC coding. FIG. 2 depicts the output port of the encoder 32 for LDPC coding connected to the input port of a bit interleaver 34.

The output port of the interleaver 34 connects to the input port of a mapper 35 for mapping successive bits of the interleaved FEC coding to successive QAM symbol constellations. In the case of transmissions broadcast for reception by stationary DTV receivers, these QAM symbol constellations are apt to be square 256QAM symbol constellations or possibly cruciform 512QAM symbol constellations, by way of specific examples. In the case of transmissions broadcast for reception by mobile DTV receivers, these QAM symbol constellations are apt to be square 16QAM symbol constellations, square 64 QAM symbol constellations or possibly cruciform 128QAM symbol constellations, by way of specific examples.

The mapper 35 parses the successive bits of the interleaved FEC coding supplied to its input port into consecutive segments or "cells", each having as many bits as in the labeling of each of the lattice points in the particular QAM constellations to which the FEC coding is mapped in the physical layer pipe PLP0. Gray mapping is preferred for square QAM symbols such as 16QAM, 64QAM, 256QAM, 1024 QAM etc. In Gray mapping the labels associated with various modulation levels of the carrier change by one bit at most for each small change in modulation level. Gray mapping is not possible for cruciform QAM constellations, but a close-to-Gray mapping is possible in which the labels associated with various modulation levels of the carrier change by one or at most two bits for each small change in modulation level. Such close-to-Gray mapping is preferred for cruciform QAM symbols such as 32QAM, 128QAM, 512QAM etc. The mapper 34 responds to the consecutive segments of the interleaved FEC coding to generate the complex coordinates of successive QAM constellations. The complex coordinates of the QAM symbol constellations are supplied from the output port of mapper 34 to the input port of a further "cell" interleaver 35 that shuffles the order of the QAM symbols in each successive time-interleaver (TI) block. This shuffling implements cyclic delay diversity (CDD) that helps the FEC coding to overcome frequency-selective fading.

The output port of the cell interleaver 35 connects to the write input port of a dual-port random-access memory (RAM) 36. The RAM 36 is capable of temporarily storing each FEC block for a number of OFDM symbol intervals to facilitate the time-interleaving of COFDM symbols from the (n+1)th physical layer pipe PLP0 with COFDM symbols from the other PLPs in the response of the assembler 30. The read output port of the RAM 36 connects to a respective input port of the assembler 30 for assembling T3 frames. The function of the cell interleaver 35 can be subsumed into the operation of the RAM 36 in actual practice, by using suitable write addressing and read addressing of the RAM 36.

FIG. 2 depicts the first physical layer pipe PLP1 further comprising elements 41-46 in cascade connection after the PLP1 BICM interface, but before a respective input port of the assembler 30 for assembling a serial stream of OFDM symbols. More specifically, FIG. 2 depicts an encoder 41 for BCH coding with its input port connected to receive the PLP1 BICM interface signal from the output port of the BBFRAME scrambler 19 and with its output port connected to the input port of an encoder 42 for LDPC coding. FIG. 2 depicts the output port of the encoder 42 for LDPC coding connected to the input port of a bit interleaver 44.

The output port of the interleaver 44 connects to the input port of a mapper 45 for mapping successive bits of the interleaved FEC coding to successive QAM symbol constellations. The mapper 45 parses the successive bits of the interleaved FEC coding supplied to its input port into consecutive segments or "cells", each having as many bits as in the labeling of each of the lattice points in the particular QAM constellations to which the FEC coding is mapped in the physical layer pipe PLP1. The mapper 44 responds to the consecutive segments of the interleaved FEC coding to generate the complex coordinates of successive QAM constellations. The complex coordinates of the QAM symbol constellations are supplied from the output port of mapper 44 to the input port of a further "cell" interleaver 45 that shuffles the order of the QAM symbols in each successive time-interleaver (TI) block. This shuffling implements cyclic delay diversity (CDD) that helps the FEC coding to overcome frequency-selective fading.

The output port of the cell interleaver 45 connects to the write input port of a dual-port random-access memory (RAM) 46. The RAM 346 is capable of temporarily storing each FEC block for a number of OFDM symbol intervals to facilitate the time-interleaving of COFDM symbols from the first physical layer pipe PLP1 with COFDM symbols from the other PLPs in the response of the assembler 30. The read output port of the RAM 46 connects to a respective input port of the assembler 30 for assembling T3 frames The function of the cell interleaver 45 can be subsumed into the operation of the RAM 46 in actual practice, by using suitable write addressing and read addressing of the RAM 46.

FIG. 2 depicts the (n)th physical layer pipe PLPn further comprising elements 51-56 in cascade connection after the PLPn BICM interface, but before a respective input port of the assembler 30 for assembling a serial stream of OFDM symbols. More specifically, FIG. 2 depicts an encoder 51 for BCH coding with its input port connected to receive the PLPn BICM interface signal from the output port of the BBFRAME scrambler 29 and with its output port connected the input port of an encoder 52 for LDPC coding. FIG. 2 depicts the output port of the encoder 52 for LDPC coding connected to the input port of a bit interleaver 54.

The output port of the interleaver 54 connects to the input port of a mapper 55 for mapping successive bits of the interleaved FEC coding to successive QAM symbol constellations. The mapper 55 parses the successive bits of the interleaved FEC coding supplied to its input port into consecutive segments or "cells", each having as many bits as in the labeling of each of the lattice points in the particular QAM constellations to which the FEC coding is mapped in the physical layer pipe PLPn. The mapper 54 responds to the consecutive segments of the interleaved FEC coding to generate the complex coordinates of successive QAM constellations. The complex coordinates of the QAM symbol constellations are supplied from the output port of mapper 54 to the input port of a further "cell" interleaver 55 that shuffles the order of the QAM symbols in each successive time-interleaver (TI) block. This shuffling implements cyclic delay diversity (CDD) that helps the FEC coding to overcome frequency-selective fading.

The output port of the cell interleaver 55 connects to the write input port of a dual-port random-access memory (RAM) 56. The RAM 56 is capable of temporarily storing each FEC block for a number of OFDM symbol intervals to facilitate the time-interleaving of COFDM symbols from the (n+1)th physical layer pipe PLPn with COFDM symbols from the other PLPs in the response of the assembler 30. The read output port of the RAM 56 connects to a respective input port of the assembler 30 for assembling T3 frames. The function of the cell interleaver 55 can be subsumed into the operation of the RAM 56 in actual practice, by using suitable write addressing and read addressing of the RAM 56.

There is usually a number of other physical layer pipes besides PLP0, PLP1 and PLPn, which other physical pipes are identified by the prefix PLP followed by respective ones of consecutive numbers three through (n−1). Each of the PLPs, n in number, may differ from the others in at least one aspect. One possible difference between these n PLPs concerns the natures of the concatenated BCH-LDPC coding these PLPs respectively employ. ETSI standard EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

Each of the interleavers 35, 45, 55 etc. in the data PLPs can by way of specific example, be composed of a cell interleaver (as specified in §§6.4 of ETSI standard EN 302 755 V1.3.1) followed in cascade connection by a time interleaver (as specified in §§6.4 of ETSI standard EN 302 755 V1.3.1). ETSI standard EN 302 755 V1.3.1 defines the OFDM cell as being the modulation value for one OFDM carrier during one OFDM symbol, e.g. a single modulation constellation point.

The pseudo-random cell interleaving spreads the cells uniformly in each FEC codeword to ensure an uncorrelated distribution of channel distortions and interference along the FEC codewords in the receiver. Furthermore the cell interleaving "rotates" the interleaving sequence differently in each of the FEC blocks of one time interleaver (TI) block. If used, time interleaving operates at PLP level, and the parameters of the time interleaving may differ for different PLPs within a T2 system or the T3 system disclosed herein.

The function of the assembler 30 is to assemble the complex coordinates of QAM symbol constellations read from the memory units 36, 46, 56 etc. for each of the PLPs into arrays of OFDM symbols to be conveyed successively within respective ones of T3 frames, analogously to what is prescribed for the T2 frames of DVB-T2 in ETSI standard EN 302 755 V1.3.1. Successive ones of these T3 frames, possibly with Future Extension Frame (FEF) parts interspersed among them, make up super-frames in the overall frame structure. The assembler 30 comprises respective buffer memories for the n PLPs and means for time-division multiplexing T3 frames from the various PLPs into an OFDM generation interface signal to be supplied to the FIG. 6 portion of the transmitter apparatus for broadcasting DTV signals. The buffer memories included in the assembler 30 are usually dual-ported random-access memories (RAMs). The time interleaving procedures described in §§6.5 of ETSI standard EN 302 755 V1.3.1 are subsumed into the addressing of these RAMs. Designs are possible in which the buffer memories for the assembler 30 are subsumed within the memory units 36, 46, 56 etc. The operation of the assembler 30 for assembling a serial stream of OFDM symbols takes into account the configuration of the frame structure and is further controlled responsive to the dynamic scheduling information produced by the scheduler 10. FIG. 2 does not explicitly show the connections for applying these control signals to the assembler 30. The assembly of the serial stream of COFDM symbols by the assembler 30, and the scheduling of time-slices by the scheduler 10 are performed in concert responsive to control signals from a master controller not explicitly depicted in FIGS. 1, 2, 3 and 4. FIG. 2 shows the assembler 30 connected for receiving at an input port thereof coordinates of P2 modulation symbols supplied from apparatus depicted in FIG. 3.

The coordinates of P2 modulation symbol constellations supplied from the FIG. 3 apparatus convey the conformation of the frame structure and also convey the dynamic scheduling information (DSI) produced by the scheduler 10. FIG. 3 depicts a first-layer signal generator 20 with two input ports and two output ports. The first of the two input ports is connected for receiving DSI from the scheduler 10, and the second of the two input ports is connected for receiving digital indications specifying the conformation of the frame structure. Responsive to these control signals received at its first and second input ports, the first-layer (L1) signal generator 20 generates L1-pre signaling at its first output port and L1-post signaling at its second output port.

FIG. 3 depicts an encoder 57 for BCH coding having its input port connected for receiving L1-pre signaling supplied from the first output port of the first-layer (L1) signal generator 20. The output port of the encoder 57 for BCH coding connects to the input port of an encoder 58 for LDPC coding. The output port of the encoder 58 connects to the input port of a puncturer 59, the output port of which connects to the input port of a mapper 60 for mapping the coded L1-pre signaling to BPSK symbol constellations. The output port of the mapper 60 connects to a first of two input ports of a time-division multiplexer 61. Details of the processing of L1-pre signaling are essentially as described in §§7.3.1.1 of ETSI standard EN 302 755 V1.3.1 for DVB-T2.

FIG. 3 depicts a bit scrambler 62 having its input port connected for receiving L1-post signaling supplied from the second output port of the first-layer (L1) signal generator 20. The bit scrambler 62 provides data bit randomization similar to that provided by the BBFRAME scramblers 9, 19 and 29. The output port of the bit scrambler 62 connects to the input port of an encoder 63 for CRC-8 coding, the output port of which connects to the input port of an encoder 64 for BCH coding. The output port of the encoder 64 for BCH coding connects to the input port of an encoder 65 for LDPC coding. FIG. 3 shows the output port of the encoder 65 connected to the input port of a puncturer 66, the output port of which connects to the input port of a bit interleaver 67 similar to the bit interleavers 33, 43 and 54. The output port of the bit interleaver 67 connects to the input port of a mapper 68 for mapping the coded L1-post signaling to BPSK, QPSK, 16QAM or 64QAM symbol constellations. The output port of the mapper 68 connects to the second input port of the time-division multiplexer 61. The puncturer 66 is optional and can be replaced by a direct connection from the output port of the encoder 65 for LDPC coding to the input port of the bit interleaver 67. Details of the processing of L1-post signaling are essentially as described in §§7.3.2 and §§7.3.3 of ETSI standard EN 302 755 V1.3.1 for DVB-T2.

The time-division multiplexer 61 is configured for generating a response therefrom that time-interleaves complex coordinates of the BPSK symbol constellations mapping respective segments of coded L1-pre signaling supplied to its first input port from the mapper 60 with the complex coordinates of the BPSK, QPSK or QAM symbol constellations mapping respective segments of coded L1-post signaling supplied to its second input port from the mapper 68. FIG. 3 indicates that the time-division multiplexer 61 supplies the complex coordinates of P2 symbols in its response to a respective input port of the assembler 30 of OFDM symbols depicted in FIG. 2.

A transmission signal in an OFDM broadcast system is transmitted in successive segments called OFDM symbol blocks. Each OFDM symbol block includes an interval during which an effective symbol is supplied for inverse discrete Fourier transformation (I-DFT), and further includes a guard interval into which the waveform of a concluding portion of the latter half of this effective symbol will be directly copied. This guard interval is provided at the beginning of the initial half of the OFDM symbol block. In an OFDM system, such a guard interval is provided to improve performance during multi-path reception. A plurality of OFDM symbol blocks are collected to form one OFDM transmission frame, which DVB-T2 denominates a T2 frame.

FIG. 4 depicts apparatus that generates and transmits radio-frequency COFDM signals responsive to the stream of OFDM symbols supplied via an OFDM generation interface from the output port of the assembler 30 for assembling a serial stream of OFDM symbols, which assembler 30 is depicted in FIG. 2. The output port of the assembler 30 connects to the input port of a parser 60 for effective OFDM symbol blocks, which parser 60 is depicted in FIG. 4. The block parser 60 parses the serial stream of OFDM symbols into uniform-length sequences of samples, each of which sequences is associated with a respective effective OFDM symbol. The output port of the block parser 60 is connected to a first input port of a unit 61 for reserving dummy tones and for inserting pilot carriers and baseband metadata into the effective OFDM symbols. ETSI standard EN 302 760 V1.3.1 identifies a number of different patterns regarding the insertion of pilot carriers into the frequency spectrum of the transmission channel, any one of which may be used for a PLP in DVB-T2. Patterns of pilot carriers to be used in transmitter apparatus embodying aspects of the invention are modified from those prescribed in the DVB-T2 standard, so as to allow for the 64 or so central COFDM carriers in the RF channel conveying baseband metadata. Apparatus 62 for generating baseband metadata generates complex coordinates prescribing the modulation of these central COFDM carriers and supplies those coordinates from its output port to a second input port of the unit 61 for reserving dummy tones and for inserting pilot carriers and baseband LTE signals into the effective OFDM symbols. An output port of the unit 61 is connected for supplying OFDM symbols to an input port of an OFDM modulator 63.

FIG. 4 depicts the OFDM modulator 63 as having 2K, 4K, 8K, 16K or 32K carriers capability. That is, nominal DFT size can be 2K, 4K, 8K, 16K or 32K. The 2K size is used solely for the preambles of data frames. The 16K and 32K sizes of DFT are particularly suitable for transmissions to stationary DTV receivers. Transmissions to mobile receivers are apt to employ smaller DFT size, 8K generally being preferred. When 4K DFT is used, the central 64 COFDM carriers conveying baseband metadata can be contiguous within the frequency spectrum, with no intervening OFDM carriers. When a larger-size DFT is used, preferable practice is for the "central" 64 COFDM carriers to be spaced apart slightly, to admit a few intervening OFDM carriers. When 8K DFT is used the central 64 COFDM carriers conveying baseband metadata alternate with OFDM carriers that convey baseband data or alternatively are pilot carriers. When 16K DFT is used the central 64 COFDM carriers conveying baseband metadata are separated from each other by three OFDM carriers that convey baseband data or alternatively are pilot carriers. When 32K DFT is used the central 64 COFDM carriers conveying baseband metadata are separated from each other by seven OFDM carriers that convey baseband data or alternatively are pilot carriers. I.e., the central 64 COFDM carriers conveying baseband metadata are located at the same positions in an RF channel irrespective of whether 4K, 8K, 16K or 32K DFT is used. This facilitates DTV receivers being re-tuned from one RF channel to another without being previously informed as to whether 4K, 8K, 16K or 32K DFT will be used in the RF channel to which the receiver is being re-tuned. (The respective spacings between the central 64 COFDM carriers conveying baseband metadata may be doubled from those earlier described in this paragraph, however, better to accommodate pilot carriers for use in channel equalization, etc.).

E.g., the OFDM modulator 63 includes a serial-to-parallel converter for converting the serially generated complex digital samples of the effective OFDM symbols to parallel complex digital samples for inverse discrete Fourier transformation (I-DFT). Such OFDM modulator 63 further includes a parallel-to-serial converter for converting the parallel complex digital samples of the I-DFT results to serial complex digital samples of the I-DFT results. FIG. 4 shows a connection for applying digital samples supplied from the output port of the OFDM modulator 63 to the input port of a peak-to-average-power-ratio (PAPR) reduction unit 64.

ETSI standard EN 302 760 V1.3.1 includes two methods for reducing PAPR in DVB-T2 that allow about a 20% reduction in peak amplifier power rating, which can save significantly on electricity costs for operating a broadcast station. In the first method, called "tone reservation", 1% of the OFDM carriers are reserved and do not carry any data, but instead may be used for inserting values that will counteract the peaks in the signal. In the second method, called "active constellation extension", the values of certain of the edge constellation points are moved "outward" in such way as to reduce the signal peaks. Since only edge constellation points are ever moved outward, their movement has no significant impact on the ability of the DTV receiver to decode the data.

The output port of the PAPR reduction unit 64 is connected to the input port of a guard-interval-and-cyclic-prefix-insertion unit 65. The output port of the guard-interval-and-cyclic-prefix insertion unit 65 connects to the input port of a digital-to-analog converter 66, the output port of which is connected for supplying analog COFDM carriers to the input port of an up converter 67. The up converter 67 converts the analog COFDM carriers in the DAC 66 response to final radio frequencies and is connected for supplying them from its output port to the input port of a linear power amplifier 68. FIG. 4 shows the output port of the linear power amplifier 68 connected for driving RF analog COFDM signal power to a transmission antenna 78. FIG. 4 omits showing some details of the DTV transmitter, such as band-shaping filters for the RF signals.

FIG. 5 illustrates a preferred format for each "half" metadata frame in the E-ULTRA signal that the apparatus 62 for generating COFDM metadata supplies to the unit 61 for reserving dummy tones and for inserting pilot carriers and COFDM metadata, through the connection from apparatus 62 to unit 61 depicted in FIG. 4. The metadata frames are transmitted using 64 adjoining carriers located mid-band in the RF channel. The OFDM carriers conveying the metadata frames have the same spacing as the OFDM carriers in DTV signal designed for 8K FFT, regardless of whether the currently transmitted DTV signal is designed for 4K, 8K, 16K or 32K FFT. This allows a DTV receiver to decode the metadata without having foreknowledge as to whether a currently received DTV signal is designed for 4K, 8K, 16K or 32K FFT.

Each "half" metadata frame begins with a preamble lasting two COFDM symbol intervals. A 63-element primary synchronization signal (PSS) is transmitted along with a single-element repeat flag in the first of these two COFDM symbol intervals, and a 62-element secondary synchronization signal (SSS) is transmitted in the second of these two COFDM symbol intervals. The PSS is transmitted via 63 adjoining COFDM carriers, each modulated with a respective one of the 63 elements of a Zadoff-Chu sequence. Preferably, a sixty-fourth adjoining COFDM carrier transmits a repeat flag during the first COFDM symbol interval in the preamble of the metadata frame. This flag has a first value if the current metadata frame will be repeated in the next metadata frame interval and has a second value if the current metadata frame will not be so repeated. During the second COFDM symbol interval in the preamble of the metadata frame, two interleaved 31-element maximum-length pseudo-random noise (PRN) sequences, as additively scrambled in accordance with the Zadoff-Chu sequence in the PSS, modulate the central 62 of the 64 adjoining COFDM carriers at mid-band of the RF channel. The remaining portion of the "half" metadata frame that follows its preamble is composed of a plurality of metadata sub-frames, each extending over eight COFDM symbol intervals.

FIG. 6 depicts the defining equations for the Zadoff-Chu sequence used as a primary synchronization signal (PSS) in "half" metadata frames as illustrated in FIG. 5. Depending on the choice of the variable M to be 25, 29 or 34, one of three different primary synchronization signals $PSS_1$, $PSS_2$ and $PSS_3$ is generated. E.g., $PSS_1$ can be used to indicate that the metadata for the next T3 frame is transmitted in the ensuing metadata frame; $PSS_2$ can be used to indicate that the metadata for the next future-extension frame (FEF) frame is transmitted in the ensuing metadata frame; and $PSS_3$ can be used to indicate when that next frame begins, whether it be a T3 frame or an FEF.

FIG. 7 depicts the defining equations for the interleaved 31-element pseudo-random noise (PN31) sequences that are additively scrambled in accordance with an immediately preceding Zadoff-Chu sequence (ZC) to generate a second synchronizing signal (SSS). The phase of each PN31 signal as mapped to the circumference of a circular cylinder can be varied so as to convey 31 respective signaling conditions. Slipping phase of both PN31 sequences generates 61×61=3721 possible SSS signaling conditions. The ranges in value of SSS are used to determine whether or not the metadata pertains to a T3 frame and, if not, what sort of FEF the metadata pertains to. It is useful to code FFT sizes and guard interval lengths using different SSS conditions. The value of SSS is used as a key for interpreting patterns of pilot carriers in the resource blocks within the metadata frame.

FIG. 8 illustrates in more detail the format of resource blocks within metadata frames per FIG. 5. Each resource block is conveyed in 8 consecutive OFDM symbol intervals by 8 adjoining ones of the 64 adjoining OFDM carriers midband in the RF channel. Each resource block is depicted as a frequency-versus-time grid, many elements of which grid are vacant as their respective OFDM carriers are for the moment zero-valued. The elements of the grid that are shaded denote the temporary presence of energized pilot carriers. The information-conveying mechanism in the resource block is the pattern of energized pilot carriers. The specific pattern depicted in FIG. 8 is but one of many possible patterns of energized pilot carriers. Each group of eight contemporaneous resource blocks in a metadata sub-frame can convey 512 bits of information if the OFDM carriers are simply keyed on and off. The pattern of energized pilot carriers in the first metadata sub-frame can be repeated in subsequent metadata sub-frames to provide delay diversity that can help overcome corruption from noise in the RF channel.

FIG. 9 illustrates one way in which the metadata channel can be placed at mid-band of the RF channel in frequency-division multiplex with the lower-frequency COFDM carriers of a DTV signal and with the higher-frequency COFDM carriers of the DTV signal. (FIG. 9 is suggestive of the sixty-four COFDM carriers conveying metadata not separated by intervening carriers. However, as noted supra other COFDM carriers may be intermingled amongst them.) Each metadata frame beings before the T3 frame or FEF conveying the DTV signal to which the metadata pertains. A metadata frame that pertains to a T3 frame begins with a $PSS_1$ so a DTV receiver is signaled early on as to have the metadata are to be processed for describing the T3 frame. A metadata frame that pertains to an FEF begins with a $PSS_2$ so a DTV receiver is signaled early on as to how the metadata are to be processed for describing the FEF. Some period of time after the beginning of the metadata frame a $PSS_2$ signals the beginning of the T3 frame or FEF frame to which the metadata in that metadata frame pertains.

The beginning of a T3 frame or FEF is assumed to include P1 and L1 signaling that corresponds to the P1 and L1 signaling at the beginning of a T2 frame or FEF as prescribed by the DVB-T2 standard. Such P1 and L1 signaling may be corrupted by noise at the beginning of a T3 frame or FEF. In the metadata transmission scheme illustrated in FIG. 9 the information in the P1 and L1 signaling is apt already to be available from the metadata frame before the beginning of T3 frame or FEF containing the corrupted P1 and L1 signaling. If that information is not already available it may become available from later in the metadata frame permitting portions of the T3 frame or FEF following the corrupted P1 and L1 signaling still to be salvaged.

If the preamble at the beginning of the metadata frame is corrupted by noise, the P1 and L1 signaling at the beginning of a T3 frame or FEF to which its metadata pertains possibly may not be corrupted by noise. In such case processing of the T3 frame or FEF can proceed based on that P1 and L1 signaling. Alternatively, when the preamble at the beginning of the last "half" of the metadata frame is not also corrupted by noise, it can direct the processing of patterns of pilot carriers in the resource blocks to provide the basis for processing of the T3 frame or FEF to which the metadata frame pertains. This alternative has to be resorted to in DTV broadcast systems in which the DTV signals do not include P1 and L1 signaling.

While FIG. 9 shows an initial half of the metadata frame preceding the start of the T3 frame or FEF that it describes and a final half following that start, in alternative designs larger portions of the metadata frame precede the start of the T3 frame or FEF it describes. In still other alternative designs a metadata frame not only contains information pertaining to the T3 frame or FEF beginning during that metadata frame, but further contains further information specific to at least one subsequent T3 frame or FEF.

Providing that the T3 data frames and any FEF data frames are of uniform size with regard to the number of OFDM symbols in each of them, the similar size and relative positioning of the metadata frames respective to the T3 or FEF data frames is quite easy to establish and maintain. Knowing the beginning of one of the uniform-size data frames, the beginning of the next metadata frame is later by one-half the number of OFDM symbols in each data frame. Conversely, knowing the beginning of a metadata frame, the beginning of the next one of the uniform-size data frames is later by one-half the number of OFDM symbols in that data frame. A DTV receiver watches for a Zadoff-Chu sequence in the baseband metadata signal that signals the beginning of a metadata frame, from which beginning the beginnings of later data frames and metadata frames can be inferred. If the uniform size of data frames and metadata frames is not standardized industry-wide to just one length of time, the size of data frames is preferably signaled in the metadata signal.

If the data frames vary in size with regard to the number of OFDM symbols in each of them, the relative positioning of successive metadata frames respective to successive data frames is more difficult to establish and maintain. Knowledge of the size of each successive data frame permits the beginning and conclusion of each successive metadata frame to be determined in the DTV receiver apparatus, as well as in the DTV transmitter apparatus. The size of each successive data frame is signaled early in the data frame, either in its preamble, or shortly thereafter in so-called "in-band" signaling. Responsive to this signaling, DTV receiver apparatus can calculate the beginning of the next metadata frame respective to the beginning of the current data frame. Alternatively, the size of each successive data frame is signaled near the beginning of the metadata frame beginning before that data frame. In a belt-and-suspenders approach both forms of signaling would be provided.

A preferred arrangement is to begin each metadata frame a prescribed number of COFDM symbol periods before the start of the ensuing data frame. The prescribed number of COFDM symbol periods preferably spans an integral number of sub-frames of a metadata frame. This number is preferably more than one, so as to provide redundant transmission of metadata for the ensuing data frame. Such arrangement allows a receiver sometimes to infer when the next data frame begins, even though the beginning is corrupted by burst noise or lost owing to momentary fade. Such arrangement is particularly attractive when the data frames each have a preamble also conveying metadata.

FIG. 9 shows metadata frames interlacing perfectly in time with the T3 frames or FEFs to which they respectively pertain. A DTV broadcast engineer may consider inserting some sort of padding in one set of frames or the other to maintain a preferred temporal relationship between each metadata frame and a T3 frame or FEF to which it pertains. The padding is preferably inserted in the succession of metadata frames, so as not to reduce digital payload in the T3 frames and FEFs, and can be provided simply by continuing the repeating metadata sub-frames.

A DTV receiver can determine the number of metadata sub-frames between the beginning of the initial "half" of a frame of metadata, as marked by a $PSS_1$ or $PSS_2$ signal, and the beginning of the final "half" of that frame of metadata, as marked by a $PSS_3$ signal. Knowing the ratio of the duration of the final "half" of the metadata frame to the duration of its initial "half", the DTV receiver can determine when the metadata frame concludes and any padding that is needed begins. The next $PSS_1$ or $PSS_2$ signals when padding ends.

The maximum number of sub-frames permitted in a metadata frame is subject to variation depending on the number of COFDM symbols in adjoining T3 frames or adjoining T3 frame and FEF. If DVB-T2 protocol is followed quite closely, T3 frame duration will be limited to 250 milliseconds. When 32K FFT is used, COFDM symbol rate is relatively low, and the resulting T3 frame size is of the order of 60 COFDM symbol intervals. If metadata sub-frame size extends over 8 COFDM symbol intervals, as few as only six metadata sub-frames per frame may have to be used. When 16K FFT is used, COFDM symbol rate is doubled, and the maximum number of metadata sub-frames per frame can be doubled. When 8K FFT is used, COFDM symbol rate is doubled again, and the maximum number of metadata sub-frames per frame can be doubled again. Having more metadata sub-frames per frame allows the metadata to be repeated more times, reducing the possibility that pattern information will be lost owing to occasional burst noise.

However, while data rate for 32K FFT of DTV signals has to be reduced about four times compared to the data rate for 8K FFT of DTV signals, the spacing of the 64 mid-band carriers used to convey metadata remains similar to that for DTV signals using 8K FFT. So it is possible (indeed desirable) to maintain the COFDM symbol rate for metadata to be the same as for DTV signals using 8K FFT, even when the DTV signals use 16K FFT or 32K FFT instead. This allows as many as 24 metadata sub-frames per frame to be used, regardless of which size of FFT is used for DTV signals. The fact of the metadata using the same COFDM symbol rate, irrespective of the COFDM symbol rate for DTV signals, facilitates the metadata being processed without having to proceed on a trial-and-error basis.

Figure 10:
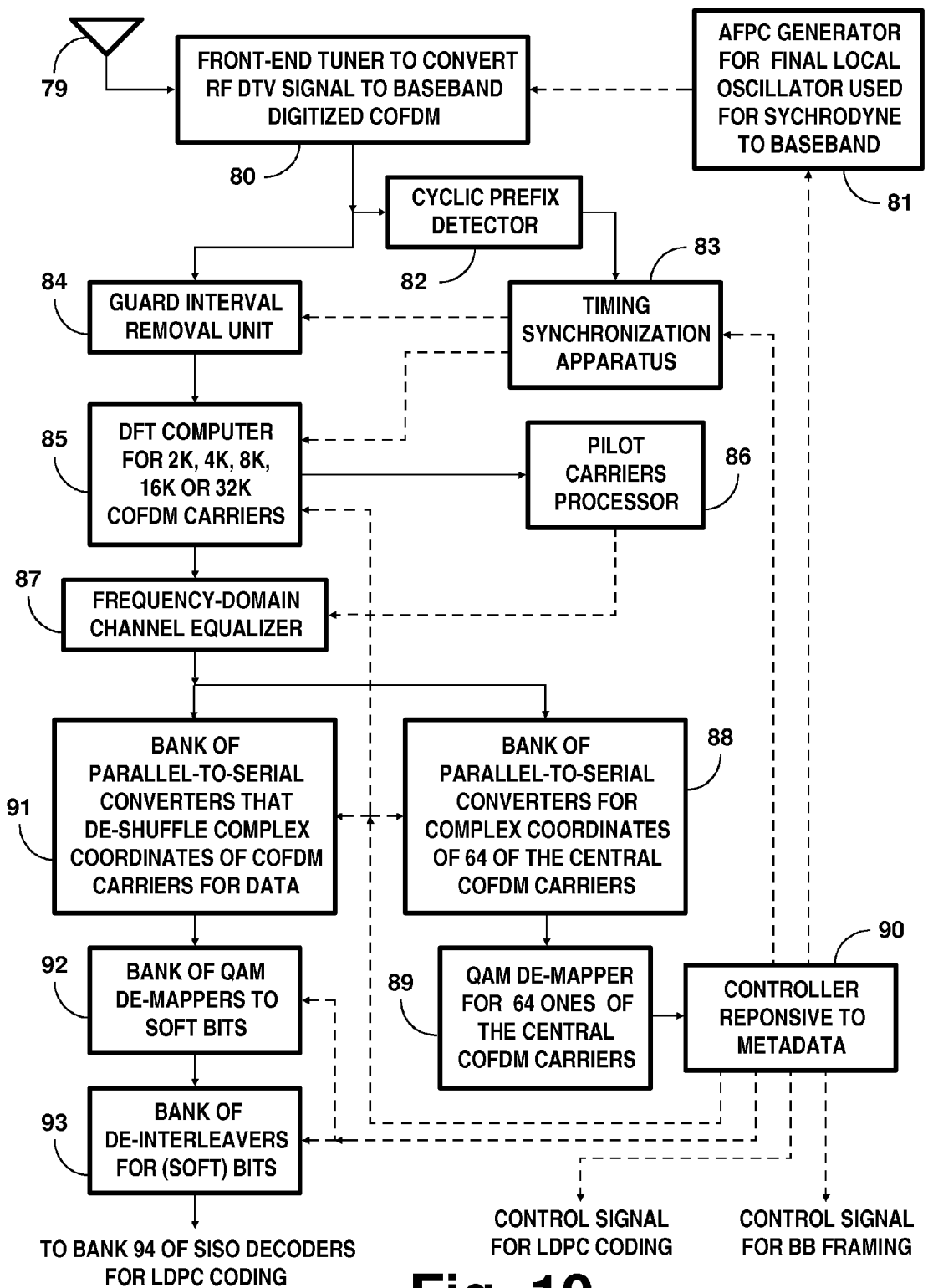
FIGS. 10 and 11 together form a schematic diagram of COFDM receiver apparatus embodying aspects of the invention, which receiver apparatus includes a controller that responds to baseband LTE signal for supplying control signals to various parts of the receiver apparatus.

FIG. 10 shows the initial portion of a DTV receiver designed for iterative-diversity reception of COFDM signals as transmitted at VHF or UHF by a DTV transmitter, such as the one depicted in FIGS. 1, 2 and 3. A reception antenna 79 captures the radio-frequency COFDM signal for application as input signal to a front-end tuner 80 of the receiver. The front-end tuner 80 can be of a double-conversion type composed of initial single-conversion super-heterodyne receiver circuitry for converting radio-frequency (RF) COFDM signal to intermediate-frequency (IF) COFDM signal followed by circuitry for performing a final conversion of the IF COFDM signal to baseband COFDM signal. The initial single-conversion receiver circuitry typically comprises a tunable RF amplifier for RF COFDM signal incoming from the reception antenna, a tunable first local oscillator, a first mixer for heterodyning amplified RF COFDM signal with local oscillations from the first local oscillator to obtain the IF COFDM signal, and an intermediate-frequency (IF) amplifier for the IF COFDM signal. Typically, the front-end tuner 80 further includes a synchronous demodulator for performing the final conversion from IF COFDM signal to baseband COFDM signal and an analog-to-digital converter for digitizing the baseband COFDM signal. Synchronous demodulation circuitry typically comprises a final local oscillator with automatic frequency and phase control (AFPC) of its oscillations, a second mixer for synchrodyning amplified IF COFDM signal with local oscillations from the final local oscillator to obtain the baseband COFDM signal, and a low-pass filter for suppressing image signal accompanying the baseband COFDM signal. In some designs of the front-end tuner 80, synchronous demodulation is performed in the analog regime before subsequent analog-to-digital conversion of the resulting complex baseband COFDM signal. In other designs of the front-end tuner 80, analog-to-digital conversion is performed before synchronous demodulation is performed in the digital regime.

Simply stated, the front-end tuner 80 converts radio-frequency COFDM signal received at its input port to digitized samples of baseband COFDM signal supplied from its output port. Typically, the digitized samples of the real component of the baseband COFDM signal are alternated with digitized samples of the imaginary component of the baseband COFDM signal for arranging the complex baseband COFDM signal in a single stream of digital samples. FIG. 10 shows an AFPC generator 81 for generating the automatic frequency and phase control (AFPC) signal for controlling the final local oscillator within the front-end tuner 80.

The output port of the front-end tuner 80 is connected for supplying digitized samples of baseband COFDM signal to the input port of a cyclic prefix detector 82. The cyclic prefix detector 82 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 82 is connected to supply these indications to a first of two input ports of timing synchronization apparatus 83.

A first of two output ports of the timing synchronization apparatus 83 is connected for supplying gating control signal to the control input port of a guard-interval-removal unit 84, the signal input port of which is connected for receiving digitized samples of baseband COFDM signal from the output port of the front-end tuner 80. The output port of the guard-interval-removal unit 84 is connected for supplying the input port of discrete-Fourier-transform computer 85 with windowed portions of the baseband COFDM signal that contain effective COFDM samples. A second of the output ports of the timing synchronization apparatus 83 is connected for supplying the DFT computer 85 with synchronizing information concerning the effective COFDM samples.

The indications concerning the phasing of COFDM symbols that the cyclic prefix detector 82 supplies to the timing synchronization apparatus 83 are sufficiently accurate for initial windowing of a baseband COFDM signal that the guard-interval-removal unit 84 supplies to the DFT computer 85. A first output port of the DFT computer 85 is connected for supplying demodulation results for at least all of the pilot carriers in parallel to the input port of a pilot carriers processor 86, and a second output port of the DFT computer 85 is connected for supplying demodulation results for each of the COFDM carriers to the input port of a frequency-domain channel equalizer 87. To implement a simple form of frequency-domain channel equalization, the pilot carriers processor 86 measures the amplitudes of the demodulated pilot carriers to determine basic weighting coefficients for various portions of the frequency spectrum. The pilot carriers processor 86 then interpolates among the basic weighting coefficients to generate respective weighting coefficients supplied (via wiring depicted as a dashed-line connection) to the frequency-domain channel equalizer 87 with which to multiply the complex coordinates of QPSK or QAM constellations supplied from the DFT computer 85. Various alternative types of frequency-domain channel equalizer are also known.

The frequency-domain channel equalizer 87 is connected for supplying demodulation results for central COFDM carriers in parallel from its output port to the respective input ports of plural banks 88 of parallel-to-series converters for 64 of those central COFDM carriers. A first of the four parallel-to-series converters in each bank of the plural banks 88 of parallel-to-serial converters converts to a serial format the complex coordinates of the 64 central COFDM carriers in 4K DFT originating from the DFT computer 85. The second of the four parallel-to-series converters in the each bank of the plural banks 88 of parallel-to-serial converts to a serial format the complex coordinates of alternate ones of the 144 central COFDM carriers in 8K DFT originating from the DFT computer 85. The third of the four parallel-to-series converters in each bank of the plural banks 88 of parallel-to-serial converts to a serial format the complex coordinates of 64 selected ones of the 288 central COFDM carriers in 16K DFT originating from the DFT computer 85. The fourth of the four parallel-to-series converters in each bank of the plural banks 88 of parallel-to-serial converts to a serial format the complex coordinates of 64 selected ones of the 576 central COFDM carriers in 32K DFT originating from the DFT computer 85. The output port of the plural banks 88 of parallel-to-series converters is connected for serially supplying the complex coordinates of 64 COFDM carriers to the input port of a QAM de-mapper 89.

The QAM de-mapper 89 is further connected for supplying baseband metadata signal to the input port of a controller 90 that controls many of the functions in the receiver apparatus depicted in FIGS. 6 and 7. The controller 90 responds to primary synchronization signal (PSS) in the baseband metadata signal to supply the DFT computer 85 with indications of OFDM symbol timing, as a first control signal from the controller 90. These indications determine the size of the FFT to be processed by the DFT computer 85. The indications of OFDM symbol timing supplied as a first control signal from the controller 90 also control the bank 188 of parallel-to-series converters, activating the appropriate one of the bank 91 of parallel-to-series converters for selecting the complex coordinates of the 64 central COFDM carriers that are currently generated by the DFT computer 85. When the front-end tuner 80 is initially tuned to an RF channel, the controller 90 supplies a start-up first control signal. The start-up first control signal conditions the DFT computer 85 to use a particular size FFT, preferably the smallest size. The controller 90 is preferably designed to restore the previous value of first control signal if there is a momentary loss in the operating power for the controller 90.

The indications of OFDM symbol timing supplied as a first control signal from the controller 90 also control a bank 91 of parallel-to-series converters, a selected one of which de-shuffles the complex coordinates of the outer COFDM carriers supplied serially from the output port of the frequency-domain channel equalizer 87 to the input port of the bank 91 of parallel-to-series converters. More specifically, these indications activate just the one of the bank 91 of parallel-to-series converters that will deshuffle the complex coordinates of the number of outer COFDM carriers currently generated by the DFT computer 85. The output port of the bank 91 of parallel-to-series converters connects to the input port of a bank 92 of QAM de-mappers, the output port of which connects to supply de-mapping results to the input port of a bank 93 of de-interleavers for the soft bits of those de-mapping results.

The controller 90 further responds to primary synchronization signal (PSS) in the baseband metadata signal from the QAM de-mapper 89 to supply the timing synchronization apparatus 83 with coarse estimates of carrier-frequency offset, as a second control signal from the controller 90. This second control signal further conveys information concerning the length of guard interval to the timing synchronization apparatus 83. The controller 90 responds to primary synchronization signal (PSS) and secondary synchronization signal (SSS) in the baseband metadata signal to supply the AFPC generator 81 with fine estimates of carrier-frequency offset, as a third control signal from the controller 90. The controller 90 responds to a pattern of reference symbols conveyed in amplitude modulation of 64 of the central ones of the OFDM carriers to specify 512 different conditions of reception. In accordance with an aspect of the invention these specified conditions are used for addressing read-only memories that more completely specify control signals associated with each of those 504 different conditions of reception. Responsive to current reception conditions, the controller 90 updates the first control signal to specify the FFT appropriate to the currently received COFDM signal.

The controller 90 responds further to current reception conditions, to supply a fourth control signal therefrom both to the bank 92 of QAM de-mappers and to the subsequent bank 93 of de-interleavers for soft bits of de-mapping results. This fourth control signal conditions the bank 92 of QAM de-mappers to activate just the one of them that is appropriate for the de-shuffled outer COFDM carriers currently generated by the DFT computer 85. This fourth control signal conditions the bank 93 of de-interleavers for soft bits to activate just the one of those de-interleavers that is appropriate for the de-mapping results currently supplied from the output port of the bank 92 of QAM de-mappers. The output port of the bank 93 of de-interleavers is connected for supplying de-interleaved soft bits of de-mapping results to the input port of a bank 94 of soft-input/soft-output decoders for LDPC coding. The controller 90 responds still further to current reception conditions, to supply a fifth control signal therefrom to the bank 94 of SISO decoders for LDPC coding.

Figure 11:
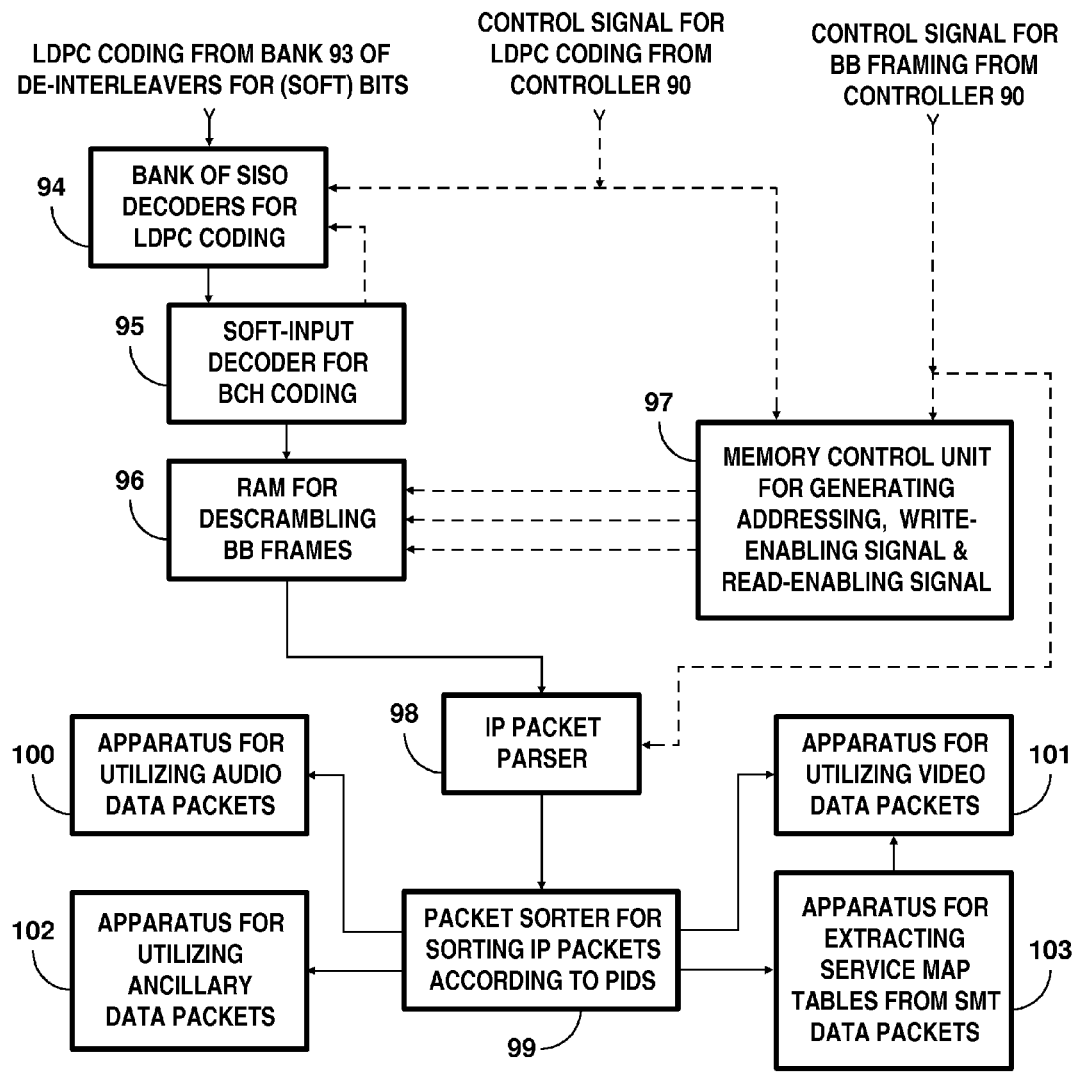

The bank 94 of SISO decoders for LDPC coding is depicted in FIG. 11 of the drawings and is conditioned by the fifth control signal from the controller 90 in FIG. 10 to activate just the SISO decoder appropriate for the current condition of reception. FIGS. 10 and 11 show the cascade connection of bank 92 of QAM de-mappers, bank 93 of soft bits de-interleavers and bank 94 of SISO decoders for LDPC coding in simpler connection than is apt to obtain in actual practice. In actual practice the selected QAM de-mapper, soft bits de-interleaver and SISO decoder for LDPC coding are likely to be in turbo connection for facilitating iterative operation of them as a group, rather than iterative processing being pursued in just the selected SISO decoder for LDPC coding.

The output port of the bank 94 of SISO decoders is connected for supplying the results of decoding LDPC coding to the input port of a decoder 95 for BCH coding. FIG. 11 shows the decoder 95 connected for feeding back indication of successful decoding to the bank 94 of SISO decoders so iterative decoding of LDPC coding can be concluded before reaching a maximum number of iterations of decoding LDPC coding that is allowed.

The output port of the decoder 95 is connected for supplying the results of decoding BCH coding to the write input port of a random-access memory (RAM) 96 connected to receive write addressing, read addressing, write-enable signal and read-enable signal from a memory control unit 97 that operates the RAM 96 for descrambling baseband (BB) frames. The read output port of the RAM 96 connects to the input port of a parser 98 for internet-protocol (IP) packets. The controller 90 shown in FIG. 10 (or in FIG. 12) is connected for supplying a sixth control signal to the memory control unit 97 and to the parser 98 for IP packets. This sixth control signal provides indications as to when BB frames are to begin. Indications as to when BB frame begin enable the memory control unit to time the generation of write addressing in a first prescribed order and the subsequent generation of read addressing in a prescribed second order, so as to descramble BB frames. The memory control unit 97 is connected for also receiving the fifth control signal from the controller 90. The specification of the code rate of the LDPC coding in this fifth control signal is used by the memory control unit 97 to control timing of its provision of write-enable signal and write addressing to the RAM 96.

The IP packet parser 98 uses the indications in the sixth control signal as to when BB frames are to begin to establish an absolute time reference for the outsets of the preambles of some IP packets. The IP packet parser 98 calculates the outset of the preamble of each other IP packet based on offset information contained in the preamble of a preceding IP packet. The output port of the IP packet parser 98 is connected to supply IP packets to the input port of a packet sorter 99 for sorting them according to their PIDs.

FIG. 11 shows a first output port of the IP packet sorter 99 connected for supplying audio data packets to the input port of apparatus 100 for utilizing audio data packets, a second output port of the IP packet sorter 100 connected for supplying video data packets to a first input port of apparatus 101 for utilizing video data packets, a third output port of the IP packet sorter 99 connected for supplying ancillary data packets to the input port of apparatus 102 for utilizing ancillary data packets, and a fourth output port of the IP packet sorter 99 connected for supplying SMT data packets to the input port of apparatus 103 for extracting service map tables. The apparatus 103 has an output port connected for supplying the service map tables in video signal format to a second input port of the apparatus 101 for utilizing video data packets. This arranges for the SMT tables to be displayed to a viewing person.

As noted supra, each sub-frame of metadata extended to include eight sample periods can convey up to 512 bits of information concerning system parameters of a DTV receiver conditioning it for receiving DTV signals transmitted in accordance with a particular standard for broadcasting. The controller 90 is apt to provide, in addition to the six control signals explicitly described supra, still other control signals used by the DTV receiver. For example, the controller 90 specifies the base sampling rate (BSR) for the DTV receiver, which BSR is selected depending on the bandwidth of the RF channel to be received. The combined numbers of bits in all the control signals supplied from the controller 90 is apt to exceed 512 bits. Not all combinations of system parameters are of practical use, however, since various ones of the system parameters are apt to have some degree of interdependency with another or other of those system parameters. Some combinations of system parameters are not of practical use since they provide poorer overall performance than other combinations of system parameters. Presuming the combinations of system parameters that are of practical use number no more than 512 for any transmissions made in accordance with a particular broadcast standard, all or part of the system parameters may be sent in signature form. Such signature, as augmented by the identification of the broadcast standard provided by the Zadoff-Chu sequence, can be used as addressing for a plurality of read-only memories (ROMs), each of which stores various values of a respective one of the control signals supplied from the controller 90. If there be a shortage of different signatures, only one of otherwise practical combinations of system parameters that have substantially the same overall performances need be used in practice.

Figure 12:
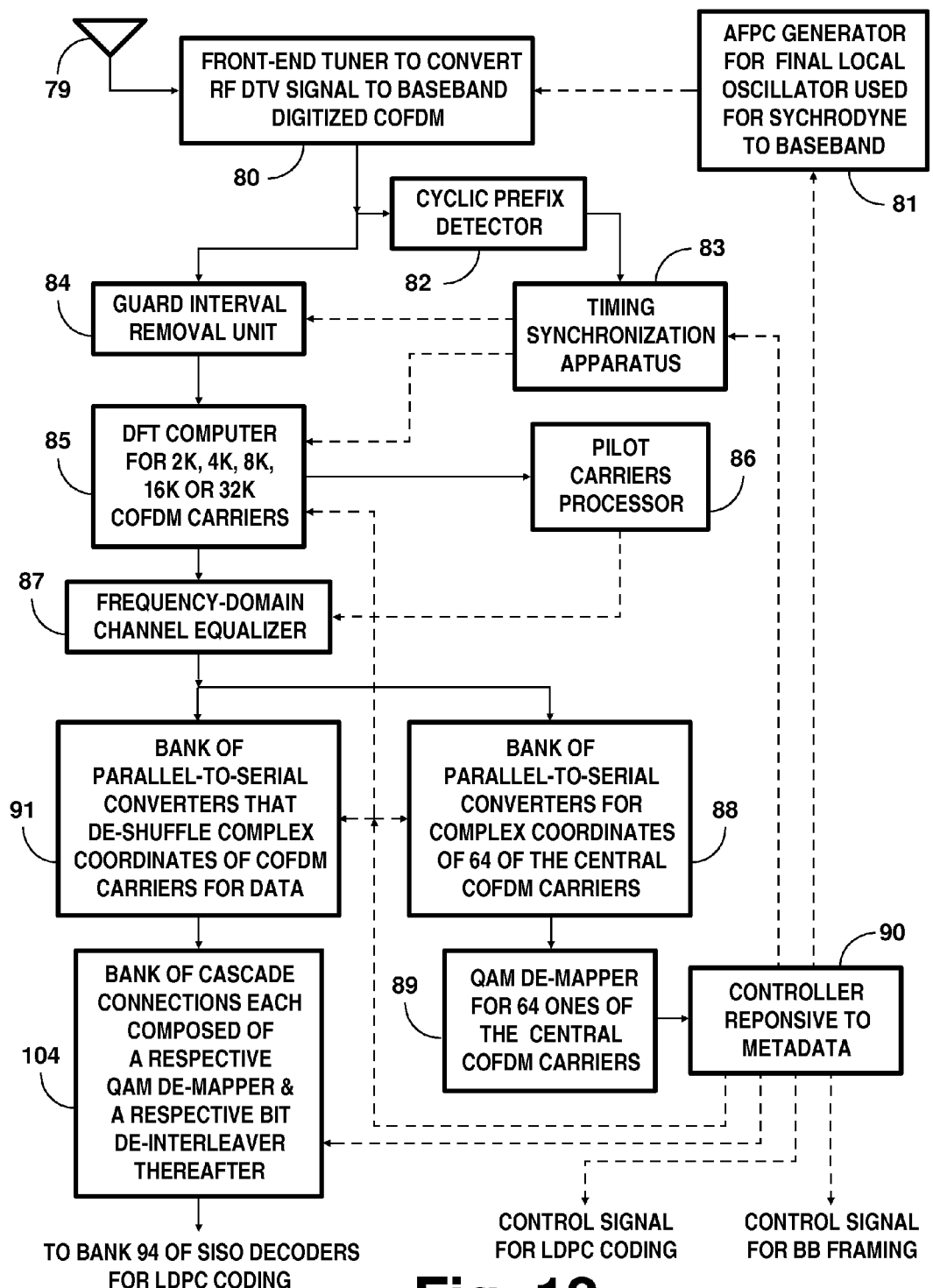

FIG. 12 depicts modified FIG. 10 COFDM receiver apparatus. The modification is the replacement of cascade connection of the bank 92 of QAM de-mappers and the bank 93 of de-interleavers for soft bits by a bank 104 of cascade connections each composed of a respective QAM de-mapper followed by a subsequent respective de-interleaver for soft bits.

The preferred embodiments of the invention described supra adapt DTV systems as prescribed by the DBT-T2 broadcast standard to incorporate E-UTRA modulation to convey metadata descriptive of the processing a receiver has to do in regard to the DTV signals. Other embodiments of the invention can put the metadata to other use, such as the transmittal of program guides.

An alternative approach for designing embodiments of aspects of the invention is to use E-UTRA modulation with metadata frames configured similar to the Long Term Evolution (LTE) signals used in cell telephony, modifying the DTV signals to suit. The T3 frames are made uniform in duration, which duration is the same as the metadata frames. This duration can be 10 milliseconds to correspond with LTE frames used in cell telephony. The P1 and L1 signaling used in DVB-T2 can be omitted. These embodiments of aspects of the invention facilitate the design of small portable receivers for both DTV and cell telephone signals, which receivers can use some of the same hardware for receiving DTV signals and for receiving and cell telephone signals.

If both this alternative approach for broadcasting DTV and the one previously described are used, the question arises as to how a receiver can quickly ascertain to which approach the currently received DTV signal conforms. This question is further complicated when the alternative approaches both use the primary synchronization signals $PSS_1$, $PSS_2$ and $PSS_3$. One way to address this problem is by applying successive components of the ZCs to decreasingly lower-frequency OFDM carriers in a first of the two approaches, but applying successive components of the ZCs to increasingly higher-frequency OFDM carriers in the second of the two approaches. In cell telephony successive components of the ZCs are applied to increasingly higher-frequency OFDM carriers and this may be desirable to do in the alternative approach for DTV broadcasting that uses fixed-duration frames for DTV signal.

Figure 13:
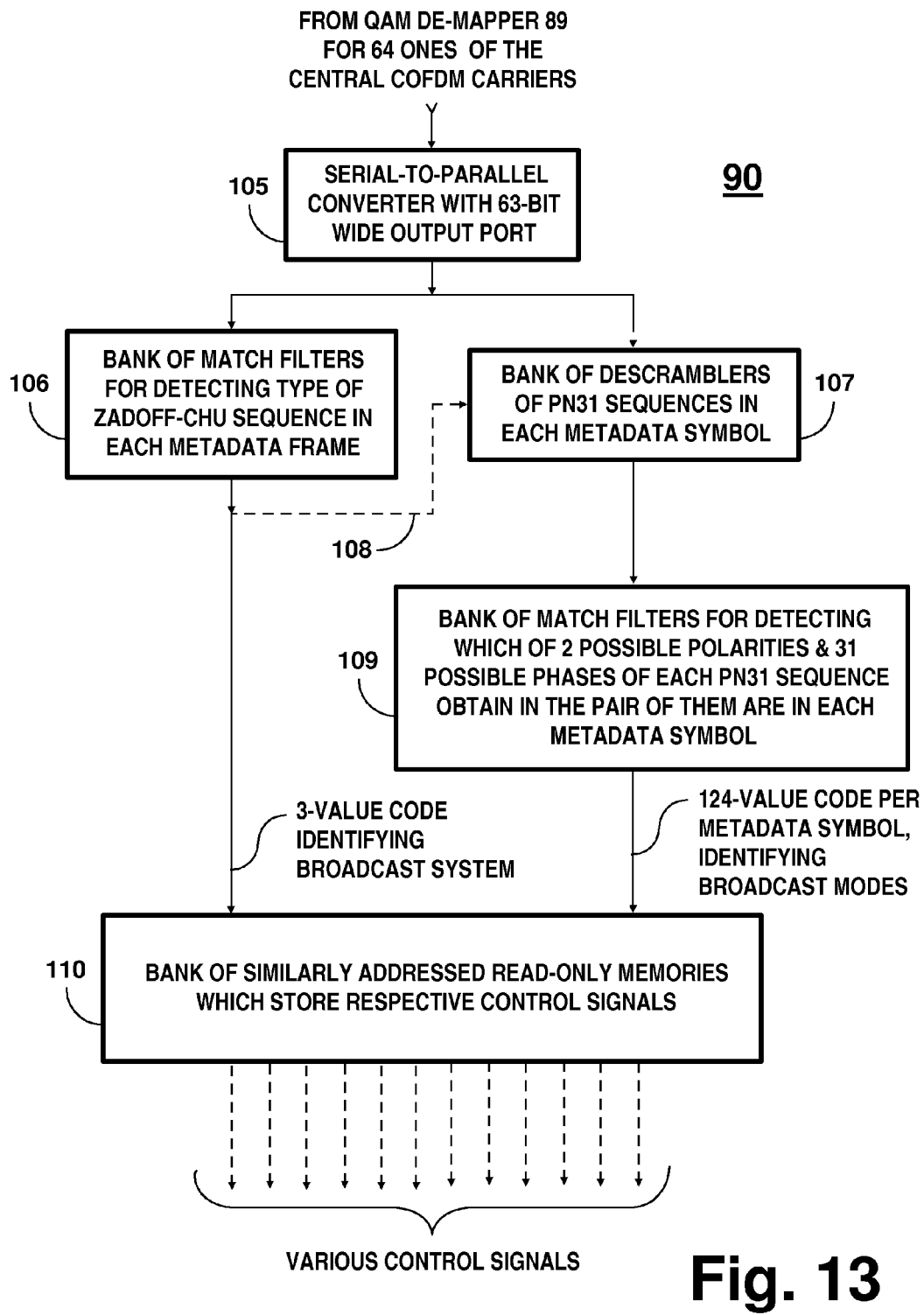
FIG. 13 is a schematic diagram of the general structure of a controller of COFDM receiver functions, as used in the COFDM receiver apparatus depicted in FIGS. 10 and 11, or as used in the COFDM receiver apparatus depicted in FIGS. 12 and 11.

FIG. 13 is a schematic diagram of the general structure of the controller 90 of COFDM receiver functions, as used in the COFDM receiver apparatus depicted in FIGS. 10 and 11, or as used in the COFDM receiver apparatus depicted in FIGS.

12 and 11. FIG. 13 is intended to convey an overall idea of such general structure to one unfamiliar with E-UTRA receiver design and accordingly omits depiction of some of the details of this general structure, such as various data latches, readily filled in by designers of average skill familiar with the design of E-UTRA receivers.

FIG. 13 shows that bits of de-mapped metadata from the QAM de-mapper 89 are supplied serially to the input port of a serial-to-parallel converter 105. FIG. 13 specifies the serial-to-parallel converter 105 having a 63-bit-wide output port, which is connected to the 63-bit-wide input port of a bank 106 of match filters for detecting which sort of Zadoff-Chu sequence begins each metadata frame. The bank 106 of match filters responds to its detecting a Zadoff-Chu (ZC) sequence in the metadata from the QAM de-mapper 89 to generate a 3-value code indicative of which of three sorts of ZC sequence it has last detected in the continuing metadata from the QAM de-mapper 89. This 3-value code is maintained in a data latch (not explicitly shown) until the bank 106 of match filters detects a next Zadoff-Chu sequence in the metadata from the QAM de-mapper 89.

The 63-bit-wide output port of the serial-to-parallel converter 105 also connects to the 63-bit-wide input port of a bank 107 of descramblers of PN31 sequences in each successive metadata symbol in a metadata frame that begins with a respective Zadoff-Chu sequence. The PN31 sequences in each successive metadata symbol supplied to the 63-bit-wide input port of the bank 107 of descramblers are additively scrambled in accordance with the ZC sequence beginning the metadata frame including that metadata symbol. The bank 107 of descramblers of PN31 sequences includes a respective descrambler for each of the sorts of ZC sequence that can begin a metadata frame. The appropriate one of the bank 107 of descramblers is selected for each metadata frame responsive to which of three sorts of ZC sequence begins that metadata frame. The data-latched 3-value code from the bank 106 of match filters detecting ZC sequences is supplied via a connection 108 to the bank 107 of descramblers to control that selection.

A 32-bit-wide pair of descrambled PN31 sequences from the selected one of the bank 107 of descramblers supplied after data latch from the output port of the bank 107 of descramblers to the input port of a bank 109 of match filters for detecting the phasing and polarity of each of the pair of descrambled PN31 sequences. There are 31 possible phasings of each of the two polarities of each one of the PN31 sequences to support a respective 62-bit positional code for that PN31 sequence. The pair of PN31 sequences together support a respective 124-value code for each metadata symbol. The respective 124-bit positional codes for all the metadata symbols in a data frame are held in data latch at the output port of the bank 109 of match filters, to supply partial read addressing to a bank 110 of similarly addressed read-only memories.

Each read-only memory (ROM) in the bank 110 of them stores possible values of one of the control signals that the controller 90 supplies for controlling operations of the COFDM receiver apparatus of FIGS. 10 and 11 or of FIGS. 12 and 11 supply partial read addressing to a bank 110 of similarly addressed read-only memories. The data-latched 3-value code from the bank 106 of match filters for detecting ZC sequences is supplied to the bank 110 of ROMS as partial read addressing that identifies which of three broadcast systems governs the transmissions of RF signal to the COFDM receiver apparatus including the controller 90. The data-latched 124-value code supplied from the output port of the bank 109 of match filters to the bank 110 of ROMs as partial read addressing identifies which particular modes of broadcasting are employed in the broadcast system specified as governing the transmissions of RF signal to the COFDM receiver apparatus including the controller 90.

Suppose the bank 110 of ROMS uses conventional off-the-shelf designs in its component ROMs. In such case, the 3-value code from the bank 106 of match filters will be expressed in a 2-bit sequential binary code, and each 124-value code from the bank 109 of match filters will be expressed in a 7-bit sequential binary code. Suppose the banks 106 and 109 of match filters are included together with the bank 110 of ROMs in a monolithic integrated circuit. In such case, the 3-value code from the bank 106 of match filters is apt to be transmitted to the bank 110 of ROMs in three respective addressing busses, and the 124-value code from the bank 109 of match filters is apt to be transmitted to the bank 110 of ROMs in 124 respective addressing busses I.e. the 3-value and 124-value codes can be transmitted to the bank 110 of ROMs without being subjected to sequential binary coding.

In actual practice the bank 110 of similarly addressed ROMs is apt to be replaced by a set of ROMS for respective control signals, at least some of which ROMs use only portions of the full read addressing supplied to all the ROMs in the bank 110 of them. Such practice can provide substantial reductions in overall memory size. Alternative ways of supplying metadata to the input ports of the bank 110 of ROMs and of the bank 107 of descramblers avoid the need for the serial-to-parallel converter 105 in the controller and for the bank 88 of parallel-to serial converters before the controller, but require respective QAM de-mappers for each of the 64 central carriers used to convey metadata. These embodiments of the aspect of the invention concerning receiver apparatus provide operation equivalent to that of the preferred embodiments, but require quite a bit of memory for the 64 separate QAM de-mappers.

Provision for receiving additional other broadcast systems newly developed over time can be made further extending the design of receivers along the lines described with reference to FIG. 13. While root Zadoff-Chu sequences 63 samples long are only three in number, the Zadoff-Chu sequences are cyclic, and each of them can be transmitted can be transmitted in any of a number of phases up to 63. So, in theory, up to 189 different broadcast systems can be identified by the three different general types of 63-sample-long ZC sequences. Identifying the different broadcast systems by different respective phasings of a single type of ZC sequence can offer economy in match filtering at the cost of somewhat slower identification of the particular broadcast system used for the transmissions being received.

The controller 90 or 190 is replaced with a controller designed to accommodate the reception of the newly added broadcast system by including a plurality of different match filters for at least one of the ZC sequences. In cases where transmission standards evolve in such way that newer DTV receivers are able to usefully receive an older standard as well as a newer standard, preferably capability to receive transmission per the newer standard will be evaluated before evaluating whether there be capability to receive transmission per the older standard.

Data frames are apt to have preambles, since a preamble that is one COFDM symbol long can convey substantially more than the 512 bits of information concerning system parameters of a DTV receiver that is the most that can be conveyed by each sub-frame of metadata extended to include eight sample periods. Certain types of system parameter data, such as patterns of the occurrences of future data frames, do not compress very well for being transmitted as parts of data frame signatures within the sub-frames of metadata frames. Such system parameter data is better transmitted in the preambles of data frames.

Figure 14:
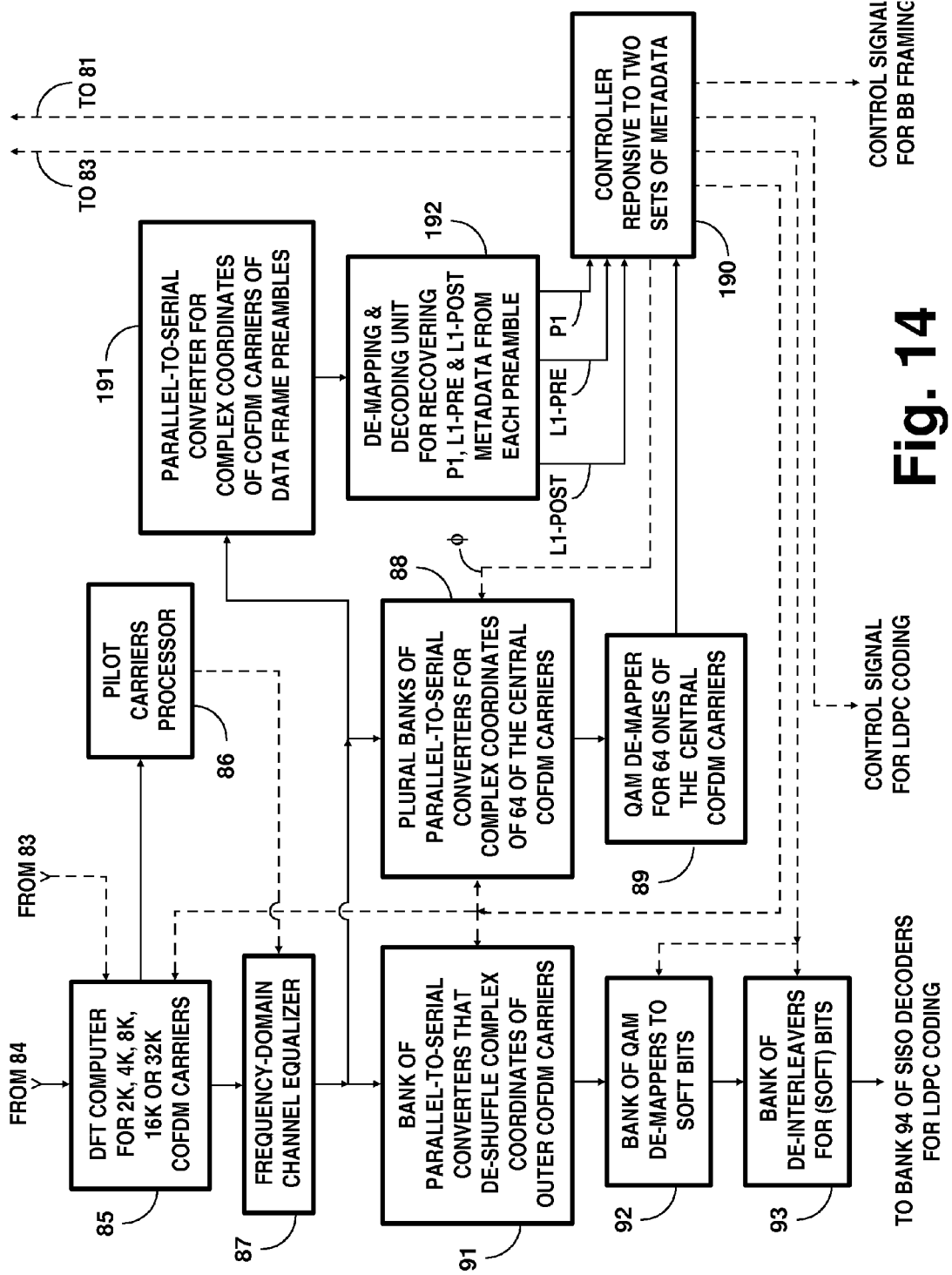
FIG. 14 is a schematic diagram of a modification made to the FIG. 10 COFDM receiver apparatus, which modification facilitates the reception of transmissions in which metadata is conveyed in preambles of data frames in addition to metadata being conveyed in metadata frames.

FIG. 14 depicts a modification of the FIG. 10 COFDM receiver apparatus to enable useful reception of metadata conveyed in the preambles of data frames in addition to the metadata conveyed in metadata frames. The controller 90 responsive to the set of metadata conveyed in metadata frames is replaced by a controller 190 responsive both to that set of metadata and to a further set of metadata conveyed in the preambles of data frames. The controller 190 is connected for receiving at a first input port thereof the set of metadata conveyed in metadata frames from the output port of the QAM de-mapper 89 for sixty-four ones of the central COFDM carriers. A parallel-to-serial converter 191 receives the complex coordinates of the COFDM carriers in data frame preambles from the channel equalizer 87 in parallel and converts those complex coordinates to serial format for application to the input port of a de-mapping and decoding unit 192. The de-mapping and decoding unit 192 responds to the complex coordinates of the COFDM carriers in data frame preambles supplied to it in series to recover P1, L1-pre and L1-post signals supplied to the controller 209 as the further set of metadata conveyed in the preambles of data frames.

The de-mapping and decoding unit 192 can be similar in design to what has been used in receivers for broadcasts made in accordance with the DVB-T2 standard. If this be the case, the parallel-to-serial converter 191 is designed to convert the complex coordinates of COFDM carriers for 2K-FFT-size data-frame preambles to serial form for application to the de-mapping and decoding unit 192. Data frame preambles using a larger FFT size have been proposed, requiring re-design of the parallel-to-serial converter 191. Such data frame preambles are apt to include error-correction coding to secure better signal-to-noise ratio after their reception. The de-mapping and decoding unit 192 must also be re-designed, and the modified design is apt to include error correction responsive to that error-correction coding.

FIG. 15 depicts a modification of the FIG. 12 COFDM receiver apparatus to enable useful reception of metadata conveyed in preambles of data frames in addition to the metadata conveyed in metadata frames. The FIG. 15 modification of the FIG. 12 COFDM receiver apparatus is similar to the FIG. 14 modification of the FIG. 10 COFDM receiver apparatus. The controller 90 is replaced by the controller 190. The controller 190 is connected for receiving at its first input port the metadata supplied from the output port of the QAM de-mapper 89 for sixty-four ones of the central COFDM carriers. The parallel-to-serial converter 191 receives the complex coordinates of the COFDM carriers in data frame preambles from the channel equalizer 87 in parallel and converts those complex coordinates to serial format for application to the input port of the de-mapping and decoding unit 192. The de-mapping and decoding unit 192 responds to the complex coordinates supplied to it in series to recover P1, L1-pre and L1-post signals that are supplied to the controller 190 as the metadata from preambles of data frames.

The metadata from a metadata frame is usually less likely to be in error than that from a data frame preamble, owing in part to the metadata in the metadata frame being transmitted in each of its sub-frames. However, a frequency-selective fade of the mid-band COFDM carriers or co-channel interference with them can disrupt reception of sub-frames of one or more metadata frames, while leaving substantially unscathed the initial and final portions of a data-frame preamble one COFDM symbol long. So, very critical metadata may be transmitted in the initial and final portions of a single-COFDM-symbol data-frame preamble as well as in the sub-frames of each related metadata frame. The controller 190 is preferably designed to recover this critical metadata as best possible.

The system parameter data information contained in the preambles of data frames is apt in some degree to be quite specific to one standard for transmitting DTV signals. Rather than the preambles of data frames assigning specific bits of transmission-system-parameter data information for each of a plurality of possible standards, the meanings of preamble bits can differ for different standards to conserve the number of bit places required in each data frame preamble. Dictionary look-up of the meanings of preamble bits is done, page selection being responsive to the reception of transmissions per a particular standard being signaled by a signature sequence transmitted in the sub-frames of metadata frame. Typical structure for performing such dictionary look-up in the controller 190 comprises a plurality of ROMs, each of which stores various values of a respective one (or ones) of the transmission system parameters. The read addressing of each these ROMs comprises first and second partial addresses. The first partial address is the signature sequence transmitted in the sub-frames of metadata frame for identifying a particular transmission standard. The second partial address is the group of bits from the data preamble to be interpreted as to their meaning. The read-out from each ROM provides bits of the transmission system parameters according to the current meaning of the bits in the second partial address for that ROM.

Newer forms of LDPC coding have been developed with improved error-correction properties, so there is less need for data to be BCH-coded before LDPC coding. When newer forms of LDPC coding are employed, the rather lengthy BCH codes are apt to be replaced by error-detection codes, such as cyclic redundancy check (CRC) codes, that include fewer parity bits and thus are more concise.

Metadata frames can be time-interleaved with data frames, rather than being frequency-interleaved therewith. This permits the number of OFDM carriers used to convey metadata to be increased without encroachment on the number of OFDM carriers used to convey data, which increase facilitates shortening the duration of each metadata frame.

The construction of various forms of receiver apparatus has been described in terms of dedicated hardware. However, persons skilled in the art of designing similar receiver apparatus will understand that in practice much of such apparatus may be provided by a suitably programmed microcomputer. Persons skilled in the art of designing DTV systems are apt to discern that various other modifications and variations can be made in the specifically described apparatuses without departing from the spirit or scope of the invention in some of its important aspects. Accordingly, it is intended that these modifications and variations of the specifically described apparatuses be considered to result in further embodiments of the invention, which are included within the scope of the appended claims and their equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. A method for generating coded orthogonal frequency division multiplex (COFDM) digital television signals suitable for broadcasting, said method comprising steps of:
   generating a serial stream of effective orthogonal frequency division multiplex (OFDM) symbol blocks conveying one or more digital television signals;
   generating a baseband metadata signal descriptive of the processes for generating said serial stream of effective OFDM symbol blocks;
   generating a serial stream of complete OFDM symbol blocks from said serial stream of effective OFDM symbol blocks by substeps including
   introducing segments of said baseband metadata signal into said serial stream of complete OFDM symbol blocks and
   introducing descriptions of pilot carrier into said serial stream of complete OFDM symbol blocks for the purpose of facilitating frequency-domain channel equalization in receivers of said COFDM digital television signals;
   modulating a plurality of orthogonal frequency-division-multiplexed carriers in accordance with said serial stream of complete OFDM symbol blocks, thus generating a COFDM signal; and
   inserting a guard interval and cyclic prefix into said COFDM signal.

2. A method as set forth in claim 1 for generating COFDM digital television signals suitable for broadcasting, wherein said baseband metadata signal is composed of successive collections of metadata symbols, each beginning with a particular Zadoff-Chu sequence indicative of the general type of DTV broadcasting system for an associated serial stream of effective OFDM symbol blocks and continuing with pseudo-random sequences scrambled by said particular Zadoff-Chu sequence, the phasing of which scrambled pseudo-random sequences more particularly specifies the processes for generating said serial stream of effective OFDM symbol blocks.

3. A method as set forth in claim 2 for generating COFDM digital television signals suitable for broadcasting, wherein each of said successive collections of metadata symbols is a respective metadata frame that begins before a respective OFDM symbol block generated according to processes specified in that said metadata frame.

4. A method as set forth in claim 1 for generating COFDM digital television signals suitable for broadcasting, wherein said baseband metadata signal is composed of successive metadata frames each having an initial portion and having a final portion immediately following its said initial portion, said initial portion of each said metadata frame beginning with a primary synchronizing signal of a first respective type followed by a secondary synchronizing signal of a first respective type and concluding with a number of sub-frames of metadata, said final portion of each said metadata frame beginning with a primary synchronizing signal of a second respective type followed by a secondary synchronizing signal of a second respective type and concluding with a number of sub-frames of metadata.

5. A method as set forth in claim 4 for generating COFDM digital television signals suitable for broadcasting, wherein each of said primary synchronizing signals of said first respective type comprises a selected one of first and second types of Zadoff-Chu sequence, and wherein each of said primary synchronizing signals of said second respective type comprises a third type of Zadoff-Chu sequence.

6. A method as set forth in claim 5 for generating COFDM digital television signals suitable for broadcasting, wherein each of said secondary synchronizing signals of said first respective type comprises a respective frequency-interleaved pair of pseudo-random noise sequences with its order scrambled in accordance with the immediately preceding selected one of said Zadoff-Chu sequences of first and second types, and wherein each of said secondary synchronizing signals of said second respective type comprises a respective frequency-interleaved pair of pseudo-random noise sequences with its order scrambled in accordance with said Zadoff-Chu sequence of third type.

7. A method as set forth in claim 1 for generating COFDM digital television signals suitable for broadcasting, said method comprising a further step of:
   reducing the peak-to-average-power ratio (PAPR) of said COFDM signal before the step of inserting a guard interval and cyclic prefix into said COFDM signal.

8. A method as set forth in claim 6 for generating COFDM digital television signals suitable for broadcasting, wherein said step of generating a serial stream of complete OFDM symbol blocks includes a further substep of:
   reserving dummy tones in said serial stream of complete OFDM symbol blocks to facilitate the subsequent said step of reducing the PAPR of said COFDM signal.

9. Receiver apparatus for receiving a selected one of coded orthogonal frequency division multiplex (COFDM) digital signals each conveying a respective baseband data signal and a respective baseband metadata signal descriptive of the processes for generating its said respective baseband data signal, each said baseband metadata signal including a Zadoff-Chu sequence and at least one pseudo-random sequence scrambled per that Zadoff-Chu sequence, which said Zadoff-Chu sequences are repeated from time to time, said Zadoff-Chu sequences indicative of the standard governing the transmission of said selected COFDM signal and the phasing of said repetitive pseudo-random sequences indicative of the processes for baseband data signal in accordance with said standard, said receiver apparatus configured for utilizing said baseband metadata signal to control its processing of said baseband data signal, and said receiver apparatus comprising:
   a front-end tuner for converting a selected radio-frequency analog COFDM signal to a digitized baseband COFDM signal;
   a discrete-Fourier-transform computer for computing selected sizes of discrete Fourier transform (DFT) of said digitized baseband COFDM signal, said DFT computer configured for supplying a first set of complex coordinates descriptive of respective quadrature-amplitude-modulated (QAM) orthogonal frequency-division multiplexed (OFDM) carrier waves which convey said respective baseband data signal and are of respective frequencies ranging from the lowest to highest frequencies in said baseband, said DFT computer further configured for supplying a second set of complex coordinates descriptive of respective OFDM carrier waves which convey said respective baseband metadata signal and are of respective midband frequencies in said baseband, said DFT computer further configured for supplying a third set of complex coordinates descriptive of respective OFDM pilot carrier waves intermingled in accordance with a specified pattern among said OFDM carrier waves which convey said respective baseband data signal;
   a guard-interval-remover unit connected for removing guard-interval digital samples including samples of cyclic prefixes from said digitized baseband COFDM signal to generate OFDM signal for application to said DFT computer as an input signal thereto;

timing synchronization apparatus for synchronizing the computation of components of said DFT with said OFDM carrier waves, connected for supplying respective control signals to said guard-interval-remover unit and to said DFT computer;

a frequency-domain channel equalizer for equalizing said first and second sets of complex samples of OFDM carrier waves supplied from said DFT computer, said equalizing being performed responsive to said third set of set of complex coordinates supplied from said DFT computer;

a bank of parallel-to-serial converters configured for converting said second set of complex coordinates describing said second set of OFDM carrier waves in the midband frequencies of said baseband COFDM signal to different respective serial sequences of complex coordinates;

a standard-determination unit for detecting which one if any of said different serial sequences of complex coordinates convey Zadoff-Chu sequences that specify said standard governing the transmission of said selected COFDM signal; and apparatus for processing said first set of complex coordinates describing QAM of OFDM carrier waves conveying baseband data signal, as supplied from said frequency-domain channel equalizer, said processing being in accordance with said standard governing the transmission of said selected COFDM signal as specified by said standard-determination unit.

10. Receiver apparatus as set forth in claim 9, said receiver apparatus further comprising:

a parallel-to-serial converter configured for converting to serial format the complex coordinates describing samples of OFDM carrier waves supplied from said DFT computer during preambles of data frames; and a de-mapper connected for generating de-mapping results responsive to said complex coordinates describing samples of OFDM carrier waves supplied from said DFT computer during preambles of data frames, as converted to serial format.

11. Receiver apparatus for receiving a selected one of coded orthogonal frequency division multiplex (COFDM) digital signals each conveying a respective baseband data signal and a respective baseband metadata signal descriptive of the processes for generating its said respective baseband data signal, each said baseband metadata signal including a Zadoff-Chu sequence and at least one pseudo-random sequence scrambled per that Zadoff-Chu sequence, which said Zadoff-Chu sequences are repeated from time to time, said Zadoff-Chu sequences indicative of the standard governing the transmission of said selected COFDM signal and the phasing of said repetitive pseudo-random sequences indicative of the processes for baseband data signal in accordance with said standard, said receiver apparatus configured for utilizing said baseband metadata signal to control its processing of said baseband data signal, and said receiver apparatus comprising:

a front-end tuner for converting a selected radio-frequency analog COFDM signal to a digitized baseband COFDM signal;

a discrete-Fourier-transform computer for computing selected sizes of discrete Fourier transform (DFT) of said digitized baseband COFDM signal, said DFT computer configured for supplying a first set of complex coordinates descriptive of respective quadrature-amplitude-modulated (QAM) orthogonal frequency-division multiplexed (OFDM) carrier waves which convey said respective baseband data signal and are of respective frequencies ranging from the lowest to highest frequencies in said baseband, said DFT computer further configured for supplying a second set of complex coordinates descriptive of respective OFDM carrier waves which convey said respective baseband metadata signal and are of respective midband frequencies in said baseband, said DFT computer further configured for supplying a third set of complex coordinates descriptive of respective OFDM pilot carrier waves intermingled in accordance with a specified pattern among said OFDM carrier waves which convey said respective baseband data signal;

a guard-interval-remover unit connected for removing guard-interval digital samples including samples of cyclic prefixes from said digitized baseband COFDM signal to generate OFDM signal for application to said DFT computer as an input signal thereto;

timing synchronization apparatus for synchronizing the computation of components of said DFT with said OFDM carrier waves, connected for supplying respective control signals to said guard-interval-remover unit and to said DFT computer;

a frequency-domain channel equalizer for equalizing said first and second sets of complex samples of OFDM carrier waves supplied from said DFT computer, said equalizing being performed responsive to said third set of set of complex coordinates supplied from said DFT computer;

a bank of parallel-to-serial converters each configured for deshuffling said first set of complex coordinates describing said set of OFDM carrier waves of said baseband COFDM signal in accordance with a respective transmission standard, one of which bank of parallel-to-serial converters is selected for supplying de-shuffled said complex coordinates describing said first set of OFDM carrier waves;

means for demapping and de-interleaving said de-shuffled complex coordinates describing said first set of OFDM carrier waves to recover de-interleaved soft bits of cells of forward-error-correction coding of said respective baseband data signal;

a bank of decoders for said forward-error-correction coding of said respective baseband data signal, each for a respective sort of forward-error-correction coding, said bank of decoders configured so a selected one of them is connected for decoding said de-interleaved soft bits of cells of forward-error-correction coding of said respective baseband data signal to reproduce said respective baseband data signal;

a further QAM de-mapper configured for de-mapping said complex coordinates describing said second set of OFDM carrier waves to reproduce said respective baseband metadata signal; and a controller connected for responding to reproduced said respective baseband metadata signal for generating a plurality of control signals to control various operations in said receiver apparatus.

12. Receiver apparatus as set forth in claim 11, wherein said controller supplies one of said plurality of control signals to said DFT computer for selecting the size of DFT of said digitized baseband COFDM signal to be computed by said DFT computer regarding a specified time interval.

13. Receiver apparatus as set forth in claim 11, wherein said means for demapping and de-interleaving said de-shuffled complex coordinates describing said first set of OFDM carrier waves to recover de-interleaved soft bits of cells of forward-error-correction coding of said respective baseband data signal comprises:

a bank of QAM de-mappers, each for a respective type of QAM of prescribed size, said bank of QAM de-mappers configured so a selected one of them as selected by one of them is connected for de-mapping said de-shuffled complex coordinates describing said first set of OFDM carrier waves, thus to generate interleaved soft bits of cells of forward-error-correction coding of said respective baseband data signal, one of said plurality of control signals from said controller governing the selection of said selected one of said bank of QAM de-mappers; and a bank of de-interleavers for soft bits, each for a respective size of cells of said forward-error-correction coding of said respective baseband data signal; said bank of de-interleavers configured so a selected one of them is connected for de-interleaving said interleaved soft bits of cells of forward-error-correction coding of said respective baseband data signal supplied from said selected one of said bank of QAM mappers, thus to generate de-interleaved soft bits of cells of forward-error-correction coding of said respective baseband data signal, one of said plurality of control signals from said controller governing the selection of said selected one of said bank of de-interleavers for soft bits.

14. Receiver apparatus as set forth in claim 11, wherein said means for demapping and de-interleaving said de-shuffled complex coordinates describing said first set of OFDM carrier waves to recover de-interleaved soft bits of cells of forward-error-correction coding of said respective baseband data signal comprises:

a bank of cascade connections of QAM de-mappers for QAM constellations of different sizes with respective de-interleavers for soft bits from de-mapping said QAM constellations, said bank of cascade connections of QAM de-mappers with respective de-interleavers configured so a selected one of those cascade connections is connected for de-mapping and de-interleaving said de-shuffled complex coordinates describing said first set of OFDM carrier waves, thus to generate de-interleaved soft bits of cells of forward-error-correction coding of said respective baseband data signal, one of said plurality of control signals from said controller governing the selection of said selected one of said bank of cascade connections of QAM de-mappers for QAM constellations of different sizes with respective de-interleavers for soft bits from de-mapping.

15. Receiver apparatus as set forth in claim 11, wherein said controller supplies one of said plurality of control signals to said bank of QAM de-mappers selecting which one of them is connected for de-mapping said de-shuffled complex coordinates describing said first set of OFDM carrier waves, and wherein said controller supplies another of said plurality of control signals to said bank of de-interleavers for selecting which one of them is connected for de-interleaving said interleaved soft bits of cells of forward-error-correction coding of said respective baseband data signal; thus to generate de-interleaved soft bits of cells of forward-error-correction coding of said respective baseband data signal.

16. Receiver apparatus as set forth in claim 11, wherein said controller supplies one of said plurality of control signals to said bank of decoders for said forward-error-correction coding of said respective baseband data signal to select which decoder is to decode said forward-error-correction coding to reproduce said respective baseband data signal in scrambled order.

17. Receiver apparatus as set forth in claim 11, further comprising;

apparatus for descrambling frames of said respective baseband data signal that are in scrambled order to supply a data stream with data in an original order, said apparatus for descrambling configured to reference the outsets of frames of said respective baseband data signal to indications of when baseband data frames begin, said indications supplied for in one of said plurality of control signals supplied from said controller to said apparatus for descrambling.

18. Receiver apparatus as set forth in claim 17, further comprising;

a packet parser for parsing said data stream supplied from said apparatus for descrambling frames of said respective baseband data signal, thus to form data packets, said packet parser configured to reference the outsets of certain packets to indications of when baseband data frames begin, said indications supplied in one of said control signals supplied from said controller to said packet parser.

19. Receiver apparatus as set forth in claim 11, wherein said decoders for FEC coding in said bank of them are soft-input/soft-output (SISO) decoders for low-density parity-check (LDPC) codes of different code rates and code lengths, each of said SISO decoders for LDPC codes configured to allow iterative decoding procedures to be conducted therewith for a number of times up to a prescribed maximum number of times.

20. Receiver apparatus as set forth in claim 19, further comprising:

a decoder for Bose-Chaudhuri-Hocquenghem (BCH) coding, having an input port connected for receiving BCH coding from said output port of said bank of SISO decoders for FEC coding as results of decoding LDPC coding, having an output port for supplying scrambled baseband frames of bits as reproduced from decoding of said BCH coding, and connected for supplying indications of successful decoding of BCH coding to of said one of which said decoders for LDPC coding selected responsive to one of said control signals supplied from said controller to be used for decoding LDPC coding, signaling that iterative decoding procedures can be discontinued before reaching said prescribed maximum number of times.

21. Receiver apparatus as set forth in claim 11, wherein said controller comprises read-only memory configured for receiving said respective baseband metadata signal as signature read addressing and being read to supply said plurality of control signals.

22. Receiver apparatus as set forth in claim 11, further comprising:

a parallel-to-serial converter configured for converting to serial format complex coordinates describing samples of OFDM carrier waves supplied from said DFT computer during preambles of data frames;

another de-mapper connected for generating de-mapping results responsive to said complex coordinates describing samples of OFDM carrier waves supplied from said DFT computer during preambles of data frames, as converted to serial format, said controller connected for generating said plurality of control signals responsive to said de-mapping results and said baseband metadata signal.

23. Receiver apparatus as set forth in claim 22, wherein said controller comprises read-only memory configured for receiving said de-mapping results partial read addressing, for receiving said respective baseband metadata signal as partial read addressing, and for being read to supply said plurality of control signals.

24. Receiver apparatus as set forth in claim 11, wherein said bank of parallel-to-serial converters is further configured for converting said second set of complex coordinates describing said second set of OFDM carrier waves in the midband frequencies of said baseband COFDM signal to a serial sequence of complex coordinates applied as input signal to said further QAM de-mapper.

25. A method as set forth in claim 1 for generating COFDM digital television signals suitable for broadcasting, wherein said baseband metadata signal is composed of successive collections of metadata symbols, each comprising a succession pseudo-random sequences scrambled by a particular Zadoff-Chu sequence indicative of the general type of DTV broadcasting system for an associated serial stream of effective OFDM symbol blocks, the phasing of which scrambled pseudo-random sequences more particularly specifies the processes for generating said serial stream of effective OFDM symbol blocks.

26. A method as set forth in claim 25 for generating COFDM digital television signals suitable for broadcasting, wherein each of said successive collections of metadata symbols is a respective metadata frame that begins before a respective OFDM symbol block generated according to processes specified in that said metadata frame.

27. Receiver apparatus for receiving a selected one of a plurality of different types of coded orthogonal frequency division multiplex (COFDM) digital signals, at least some of which COFDM digital signals convey digital television information, each COFDM signal conveying a respective baseband data signal and a respective baseband metadata signal descriptive of processes used by a preceding transmitter for generating said respective baseband data signal, said receiver apparatus configured for processing the respective baseband data signal of each different type of COFDM digital signal selected for reception in accordance with said respective baseband metadata signal descriptive of the processes for generating that said respective baseband data signal, said processing of baseband data signals being controlled by control signals supplied from a controller in said receiver apparatus which controller generates said control signals responsive to said baseband metadata signals, said receiver apparatus characterized by:

an improvement enabling said controller to utilize baseband metadata signals each including repeated pseudo-random binary sequences scrambled per a Zadoff-Chu sequence, said Zadoff-Chu sequence being used to provide said controller in said receiver apparatus—an indication of the particular standard governing transmission of said selected COFDM signal, and the phasing of said repeated pseudo-random sequences being used to provide said controller in said receiver apparatus—further indications of the particular processes said receiver apparatus is to perform in order to recover said baseband data signal in accordance with that said particular standard.

28. Improved receiver apparatus as set forth in claim 27, wherein said improvement comprises:

demodulator circuitry for determining complex coordinates of QAM modulation of selected portions of said COFDM carriers conveying said baseband metadata signals each including repeated pseudo-random binary sequences scrambled per a Zadoff-Chu sequence;

a QAM de-mapper configured for de-mapping those said complex coordinates to reproduce ones of said baseband metadata signals that each include repeated pseudo-random binary sequences scrambled per a Zadoff-Chu sequence;

a standard-determination unit for detecting which Zadoff-Chu sequence was used to scramble said repeated pseudo-random binary sequences, thus to determine the particular standard governing the transmission of said selected COFDM signal;

a detector of the polarity and phasing of said repeated pseudo-random binary sequences to recover additional baseband metadata identifying broadcast modes within a particular standard governing the transmission of said selected COFDM signal; and modifications of said controller for responding to said additional baseband metadata and to said particular standard governing the transmission of said selected COFDM signal, thus to affect at least some of the control signals supplied from said controller.

29. Improved receiver apparatus as set forth in claim 28, wherein said detector of the polarity and phasing of said repeated pseudo-random binary sequences comprises:

a bank of descramblers for said repeated pseudo-random binary sequences; and a bank of match filters for respectively detecting a different one of possible phasings of said repeated pseudo-random binary sequences in a respective polarity thereof, said bank of match filters connected for receiving descrambled said repeated pseudo-random binary sequences from one of said bank of descramblers as selected responsive to said particular standard governing the transmission of said selected COFDM signal.

30. Improved receiver apparatus as set forth in claim 27, wherein said baseband metadata signals each including repeated pseudo-random binary sequences scrambled per a Zadoff-Chu sequence are conveyed by COFDM carriers within a band of frequencies narrower than the band of frequencies spanning COFDM carriers conveying said baseband data signals.

* * * * *